US006339756B1

(12) United States Patent
Hinderks

(10) Patent No.: US 6,339,756 B1
(45) Date of Patent: Jan. 15, 2002

(54) SYSTEM FOR COMPRESSION AND DECOMPRESSION OF AUDIO SIGNALS FOR DIGITAL TRANSMISSION

(75) Inventor: Larry W. Hinderks, Holmdel, NJ (US)

(73) Assignee: Corporate Computer Systems, Holmdel, NJ (US)

(*) Notice: Subject to any disclaimer, the term of this patent is extended or adjusted under 35 U.S.C. 154(b) by 0 days.

(21) Appl. No.: 09/664,727

(22) Filed: Sep. 19, 2000

Related U.S. Application Data

(63) Continuation of application No. 09/531,020, filed on Mar. 20, 2000, which is a continuation of application No. 08/630,790, filed on Apr. 10, 1996, now Pat. No. 6,041,295, which is a continuation of application No. 08/420,721, filed on Apr. 10, 1995, now abandoned, which is a continuation of application No. 08/419,200, filed on Apr. 10, 1995, now abandoned.

(51) Int. Cl.[7] .............................................. G10L 19/00
(52) U.S. Cl. .................... 704/201; 704/200.1; 704/206
(58) Field of Search ................................ 704/200, 201, 704/203–206, 229, 230, 278, 200.1, 270.1

(56) References Cited

U.S. PATENT DOCUMENTS

| 4,346,262 A | * | 8/1982 | Willems et al. ............. 704/217 |
| 4,624,012 A | * | 11/1986 | Lin et al. ..................... 704/261 |
| 4,641,343 A | * | 2/1987 | Holland et al. ............. 704/276 |
| 5,151,998 A | * | 9/1992 | Capps ......................... 704/278 |
| 5,301,363 A | * | 4/1994 | Hinderks .................... 455/101 |
| 6,041,295 A | * | 3/2000 | Hinderks .................... 704/206 |

OTHER PUBLICATIONS

Brandenburg, ISO–MPEG–1 Audio: A Generic Standard for Coding of High–Quality Digital Audio, Journal of the Audio Engineering Society, vol. 42, No. 10, Oct. 1994, pp. 780–792.*

* cited by examiner

*Primary Examiner*—David D. Knepper
(74) *Attorney, Agent, or Firm*—Nath & Associates PLLC; Robert C. Ryan

(57) ABSTRACT

A audio digital CODEC is provided with various parameters that when changed affect the quality of the resultant audio. These psycho-acoustic parameters include the standard ISO parameters and additional parameters to aid in effecting a pure resulting audio quality. The psycho-acoustic parameters located in the audio digital CODEC can be monitored and controlled by the user. The parameters can be monitored by a speaker associated with the CODEC or headphones. The user can control the adjustment of the psycho-acoustic parameters through the use of knobs present on the front panel of the CODEC or graphic or digital representations. Adjustment of the parameters will provide real time change of the resulting audio sound that the user can monitor through the speaker or the headphones. Selections may also be made to connect to a plurality of transmission facilities.

61 Claims, 23 Drawing Sheets

Microfiche Appendix Included
(15 Microfiche, 912 Pages)

REAL TIME EVALUATION

| Channel | Subband | Difference Value | Allocation Step |
|---|---|---|---|
| 1 | 7 | 2db | 3 |
| 2 | 3 | 3db | 2 |
| 1 | 7 | 4db | 2 |

SYSTEM FOR COMPRESSION AND DECOMPRESSION OF AUDIO SIGNALS FOR DIGITAL TRANSMISSION

RELATED APPLICATION

This application is a continuation of U.S. patent application Ser. No. 09/531,020 filed Mar. 20, 2000, which is a continuation of U.S. patent application Ser. No. 08/630,790, filed Apr. 10, 1996, now U.S. Pat. No. 6,041,295, which is a continuation of U.S. patent application Ser. No. 08/420, 721, filed Apr. 10, 1995 abandoned and a continuation of U.S. patent application Ser. No. 08/419,200, filed Apr. 10, 1995 now abandonded.

SOURCE CODE APPENDIX

Source code for the control processor of the present invention has been included is a microfiche SOURCE CODE APPENDIX found in U.S. Pat. No. 6,041,295 having 15 sheets and 912 frames.

FIELD OF THE INVENTION

The present invention relates generally to an audio CODEC for the compression and decompression of audio signals for transmission over digital facilities, and more specifically, relates to an audio CODEC that is programmable by a user to control various CODEC operations, such as monitoring and adjusting a set of psycho-acoustic parameters, selecting different modes of digital transmission, and downloading new compression algorithms.

BACKGROUND OF THE INVENTION

Current technology permits the translation of analog audio signals into a sequence of binary numbers (digital). These numbers may then be transmitted and received through a variety of means. The received signals may then be converted back into analog audio signals. The device for performing both the conversion from analog to digital and the conversion from digital to analog is called a CODEC. This is an acronym for COder/DECoder.

The cost of transmitting bits from one location to another is a function of the number of bits transmitted per second. The higher the bit transfer rate the higher the cost. Certain law of physics in human and audio perception establish a direct relationship between perceived audio quality and the number of bits transferred per second. The net result is that improved audio quality increases the cost of transmission.

CODEC manufacturers have developed technologies to reduce the number of bits required to transmit an) given audio signal (compression techniques) thereby reducing the associated transmission costs. The cost of transmitting bits is also a function of the transmission facility used, i.e., satellite, PCM phone lines, ISDN (fiber optics).

A CODEC that contains some of these compression techniques also acts as a computing device. It inputs the analog audio signal, converts the audio signal to a digital hit stream, and then applies a compression technique to the bit stream thereby reducing the number of bits required to successfully transmit the original audio signal. The receiving CODEC applies the same compression techniques in reverse (decompression) so that it is able to convert the compressed digital bit stream back into an analog audio signal. The difference in quality between the analog audio input and the reconstructed audio output is an indication of the quality of the compression technique. The highest quality technique would yield an identical signal reconstruction.

Currently, the most successful compression techniques are called perceptual coding techniques. These types of compression techniques attempt to model the human ear. These compression techniques are based on the recognition that much of what is given to the human ear is discarded because of the characteristics of the ear. For example, if a loud sound is presented to a human ear along with a softer sound, the ear will only hear the loud sound. As a result, encoding compression techniques caneffectively ignore the softer sound and not assign any bits to its transmission and reproduction under the assumption that a human listener can not hear the softer sound even if it is faithfully transmitted and reproduced.

Many conventional CODECs use perceptual coding techniques which utilize a basic set of parameters which determine their behavior. For example, the coding technique must determine how soft a sound must be relative to a louder sound in order to make the softer sound a candidate for exclusion from transmission. A number which determines this threshold is considered a parameter of the scheme which is based on that threshold. These parameters are largely based on the human psychology of perception so they are collectively known as psycho-acoustic parameters.

However, conventional CODECs which use perceptual coding have experienced limitations more specifically, manufacturers of existing CODECs preprogram all of the CODECs operating variables which control the compression technique, decompression technique, bit allocation and transmission rate. By preprogramming the CODEC, the manufacturer undesirably limits the user interaction with the resulting CODEC. For example, it is known that audio can be transmitted by digital transmission facilities. These digital transmissions include digital data services, such as conventional phone lines, ISDN, T1, and E1. Other digital transmission paths include RF transmission facilities such as spread spectrum RF transmission and satellite links.

Although existing CODECs can transmit compressed audio signals via digital transmission facilities, any variables regarding the mode of transmission are preprogrammed by the manufacturer of the CODEC, thereby limiting the CODECs use to a single specific transmission facility. Hence, the user must select a CODEC which is preprogrammed to be compatible with the user's transmission facility. Moreover, existing CODECs operate based on inflexible compression and bit allocation techniques and thus, do not provide users with a method or apparatus to monitor or adjust the CODEC to fit the particular user's wants and needs. Accordingly, users must test CODECs with different compression and bit allocation techniques and then select the one device which has the features or options so desired, e.g. satellite transmission capabilities.

Moreover, standard coding techniques have been developed in order to ensure interoperability of CODECs from different manufacturers and to ensure an overall level of audio quality, thereby limiting the CODEC's use to a single specific transmission facility. One such standard is the so-called ISO/MPEG Layer-II compression standard, for the compression and decompression of an audio input. This standard sets forth a compression technique and a bit stream syntax for the transmission of compressed binary data. The ISO/MPEG Layer-II standard defines a set of psycho-acoustic parameters that is useful in performing compression. U.S. Pat. No. 4,972,484, entitled "Method of Transmitting or Storing Masked Sub-band Coded Audio Signals," discloses the ISO/MPEG Layer-II standard and is incorporated by reference.

However, conventional CODECs do not use a uniform set of parameters. Each CODEC manufacturer determines their own set of psycho-acoustic parameters either from a known standard or as modified by the manufacturer in an attempt to provide the highest quality sound while using the lowest number of bits to encode audio. Once the manufacturer selects a desired parameter set, the manufacturer programs values for each of the parameters. These preprogrammed parameter values correspond to the manufacturer's perception of an optimal audio quality at the decoder.

However, in conventional CODECs, users typically are unaware of the existence or nature of these parameters. Further, the user has no control over the parameter values. As a result, users were required to test different CODECs from different manufacturers and then select the CODEC that met the user's requirements or that sounded best to the user.

Typically, conventional CODECs utilize standard parameters which have been accepted by the International Standards Organization (ISO) and have been adopted as part of the International Standards Organization, Motion Picture Experts Group (ISO/MPEG) Layer-II compression standard. However, the ISO/MPEG Layer-II standard has met with limited acceptance since these parameters do not necessarily provide CD quality output. The ISO/MPEG Layer-II parameters are determined and set based on the average human ear. The parameters do not account for the variations between each individuals hearing capabilities. Hence, the conventional standards and CODECs do not afford the ability for users to tune their CODEC to the user's individual subjective hearing criteria. Nor are conventional CODECs able to meet changing audio needs and to shape the overall sound of their application.

A need remains within the industry for an improved CODEC which is more flexible, programmable by the user, and which overcomes the disadvantages experienced heretofore. It is an object of the present invention to meet this need.

OBJECTS OF THE INVENTION

It is an object of the present invention to provide a programmable audio CODEC that can be monitored, controlled and adjusted by a user to control the various functions of the CODEC.

It is another object of the present invention to provide an audio CODEC that is programmable by a user to transmit compressed digital bit streams over various user selected digital transmission facilities.

It is an object of the present invention to provide a user programmable audio CODEC with a plurality of psycho-acoustic parameters that can be monitored, controlled, and adjusted by a user to change the audio output from the CODEC.

It is a related object of the present invention to provide an audio CODEC with new psycho-acoustic parameters.

It is a further related object of the present invention to provide an audio CODEC where the psycho-acoustic parameters are changed by knobs on the front panel of the CODEC.

It is another related object of the present invention to provide an audio CODEC where the psycho-acoustic parameters are changed by a keypad on the front panel of the CODEC.

It is still a further related object of the present invention to provide an audio CODEC with a personal computer connected thereto to adjust the psycho-acoustic parameters by changing graphic representations of the parameters on a computer screen.

It is a related object of the present invention to provide an audio CODEC that is programmable by a user to transmit compressed digital bit streams over a digital data service.

It is a further related object of the present invention to provide an audio CODEC that is programmable by a user for transmission of compressed digital bit streams over any of T1, E1 and ISDN lines or over RF transmission facilities.

It is yet another related object of the present invention to provide an audio CODEC that is user programmable for transmission of compressed digital bit streams via satellite.

It is a further object of the present invention to provide an audio CODEC for transmission of asynchronous data together with the transmission of compressed audio.

It is still a further object of the present invention to provide an audio CODEC that utilizes the multiple audio compression and decompression schemes.

It is still another object of the present invention to provide an audio CODEC which allows a user to select one of several stored audio compression techniques.

It is still another object of the present invention to provide an audio CODEC that is remotely controlled by a host computer.

It is still another object of the present invention to provide an audio CODEC for monitoring either the encoder input signal or the decoder output signal with the use of headphones.

It is still another object of the present invention to provide an audio CODEC with safeguards for automatically selecting a second transmission facility if a first user selected transmission facility fails.

It is yet another object of the present invention to provide an audio CODEC that can be controlled by inputting control commands into a key pad on the front panel of the CODEC.

It is related object of the present invention to provide an audio CODEC having a user interface to control and program the audio CODEC through the use of a graphics display on the front panel.

It is still another related object of the present invention to provide for connection of a personal computer to the audio CODEC for controlling the input of program information thereto.

It is still another object of the present invention to provide bi-directional communication between two audio CODECs.

It is still another object of the present invention to provide an audio CODEC that can be interfaced to a local area network.

It is yet another object of the present invention to provide an audio CODEC that will provide programmed information to users through the use of indicators on the front panel of the CODEC.

It is yet another object of the present invention to provide an audio CODEC that can send non-audio compressed information including text, video and graphic information.

It is still another object of the present invention to provide an audio CODEC that can store and retrieve information on and from an electronic storage medium or a disk drive.

It is still another related object of the present invention to provide an audio CODEC that can transmit control information along with the textual video and graphic in formation.

It is still a further object of the present invention to provide digital audio compression techniques that yield improved and preferably CD quality audio.

It is a related object of the present invention to provide a compression scheme that yields better audio quality than the MPEG compression standard.

It is still another related object of the present invention to provide CD quality audio that achieves a 12 to 1 compression ratio.

SUMMARY OF THE INVENTION

The present invention provides a CODEC which holds several compression algorithms and allows the user easily to download future audio compression algorithms as needed. This makes the present CODEC very versatile and prevents it from becoming obsolete.

The preferred CODEC provides for both digital and analog input of external signals. The CODEC is also capable of handling a wide variety of ancillary data which can be incorporated into the compressed bit stream along with the audio and header data. The ancillary bit stream preferably enters the encoder directly from external sources. However, the user could alternatively choose to have the external data multiplexed into a composite ancillary bit stream before being encoded with the audio and header data. The preferred CODEC also provides for rate adaptation of signals that are input (and output) at one rate and compressed (and decompressed) at yet another rate. This rate adaptation an also be synchronized to external clock sources.

The user can also programmably alter the psycho-acoustic compression parameters to optimize transmissions under different conditions. The disclosed invention also allows the user to programmably control CODEC transmission modes as well as other CODEC operations. Such programmable control is achieved through remote interfaces and/or direct keypad control.

The compressed output signal can also be interfaced with a variety of external sources through different types of output Digital Interface Modules (DIMs). Similar input DIMs would input return signals for decoding and decompression by the CODEC. Certain specialized DIMs might also operate as satellite receiver modules. Such modules would preferably store digital information as it becomes available for later editing and use. Satellite receiver modules would be capable of receiving information such as audio, video, text, and graphics. This information would then be decoded and decompressed as appropriate by the CODEC.

Additional features and advantages of the present invention will become apparent to one of skilled in the art upon consideration of the following detailed description of the present invention.

BRIEF DESCRIPTIONS OF THE DRAWINGS

DETAILED DESCRIPTION OF THE PREFERRED EMBODIMENT

CODEC System with Adjustable Parameters

Figure 14:
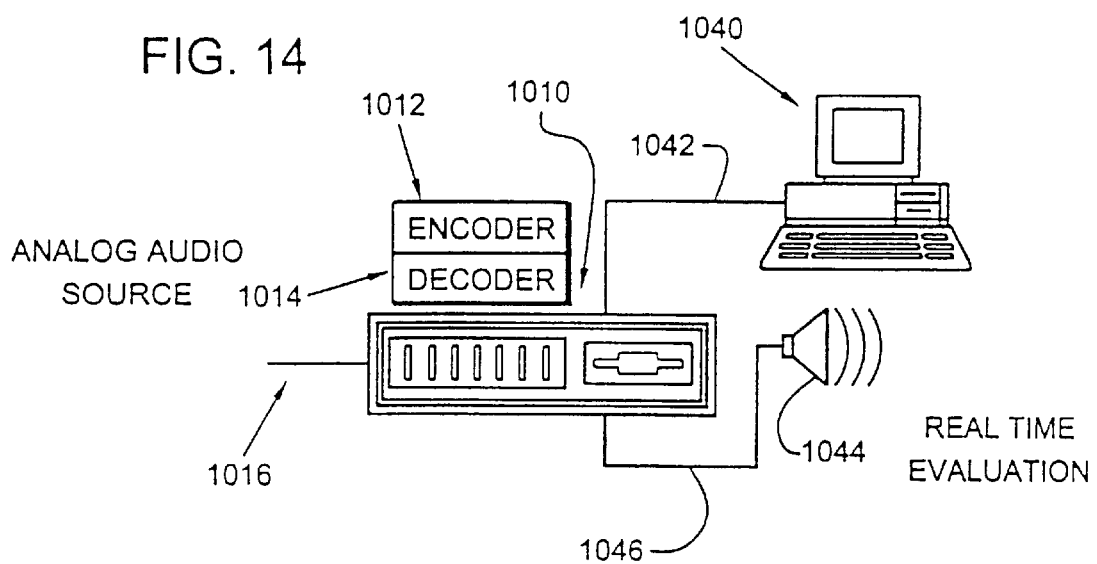
FIG. 14 is a diagram illustrating the interconnection between various modules in accordance with a preferred embodiment.
Figure 15:
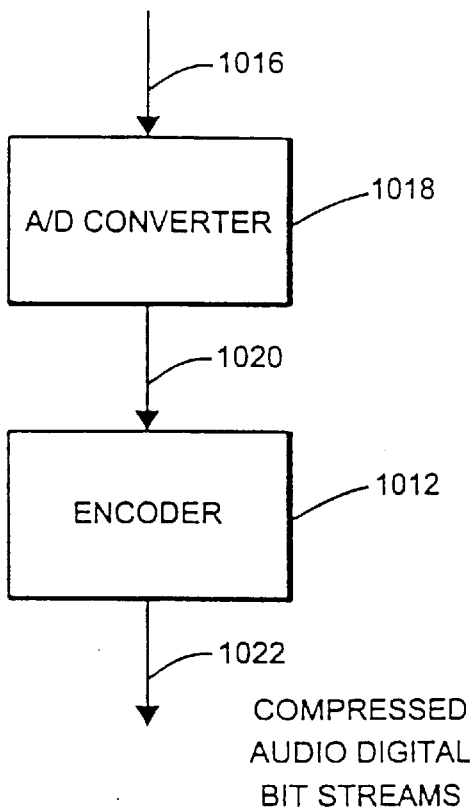
FIG. 15 is a block diagram of an embodiment of an encoder as implemented in the CODEC of the system in accordance with the preferred embodiment shown in FIG. 14.

With reference to FIGS. 14 and 15, a CODEC 1010 has an encoder 1012 and a decoder 1010. The encoder 1012 receives as input an analog audio source 1016. The analog audio source 1016 is converted by an analog to digital converter 1018 to a digital audio bit stream 1020. The analog to digital converter 1018 can be located before the encoder 1012, but is preferably contained therein. In the encoder 1012, compression techniques compress the digital audio bit stream 1020 to filter out unnecessary and redundant noises. In the preferred embodiment, the compression technique utilizes the parameters defined by the ISO/MPEG Layer-II standard as described in U.S. Pat. No. 4,972,484, and in a document entitled, "Information Technology Generic Coding Of Moving Pictures And Associated Audio," and is identified by citation ISO 3-11172 Rev. 2. The '484 patent and the ISO 3-11172, Rev. 2 Document are incorporated by reference.

In addition, the compression technique of the preferred embodiment of the encoder 1012 adds several new parameters as explained below. The resultant compressed digital audio bit stream 1022 is then transmitted by various transmission facilities (not shown) to a decoder at another CODEC (not shown). The decoder decompresses the digital audio bit stream and then the digital bit stream is converted to an analog signal.

The compression technique utilized by the CODEC 1010 to compress the digital audio bit stream 1020 is attached as the Source Code Appendix, and is hereby incorporated by reference.

Human Auditory Perception—Generally

The audio compression routine performed by the encoder 1012 is premised on several phenomena of human auditory perception. While those phenomena are generally understood and explained in the ISO Document and '484 patent referenced above, a brief summary is provided hereafter.

Generally, it is understood that when a human ear receives a loud sound and a soft sound, close in time, the human will only perceive the loud sound. In such a case, the loud sound is viewed as "masking" or covering up the quiet or soft sound.

The decree to which the softer sound is masked is dependent, in part, upon the frequencies of the loud and soft sounds and the distance between the frequencies of the loud and soft sounds. For instance, a loud sound at 700 Hz will have a greater masking effect upon a soft sound at 750 Hz than upon a soft sound at 900 Hz. Further, typically, the ear is more discriminating between loud and soft sounds at low frequencies as compared to loud and soft sounds at high frequencies.

Another aspect of hearing and psycho-acoustics is that a person can hear two tones at the same frequency provided that the softer tone is close enough in amplitude to the louder tone. The maximum difference in amplitude between the two tones of common frequency is referred to as the masking index. The masking index is dependent, in part, upon frequency of the tones. Generally, the masking index increases with frequency. For instance, the masking index of a masking tone at 1000 Hz will be smaller than the masking index of a masking tone at 7000 Hz.

Figure 17:
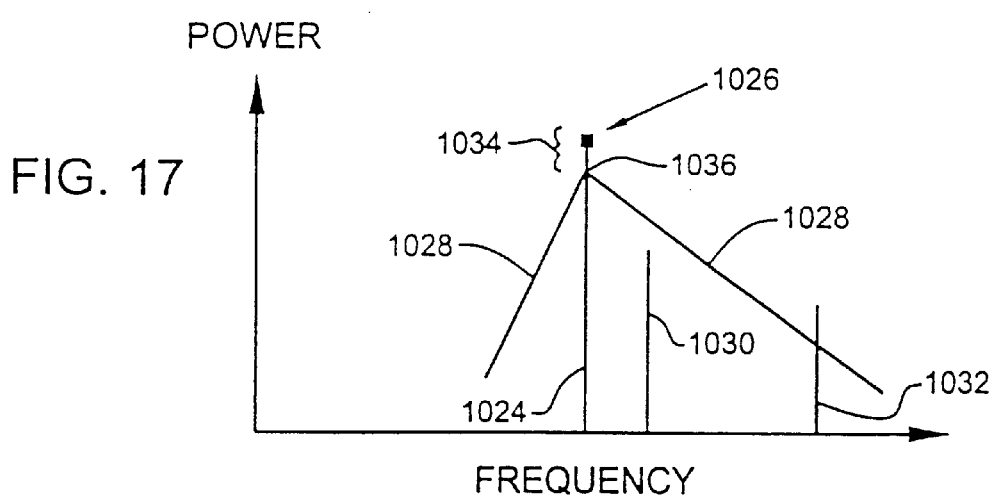
FIG. 17 is a diagram illustrating a known representation of a tonal masker and its associated masking skirts as recognized by a CODEC system.

FIG. 17 illustrates the masking index 1034 for the tonal masker 1024. Thus, the masking effect will be greater for a loud sound at 7000 Hz upon a soft sound 7050 Hz as compared to the masking effect of a loud sound at 700 Hz upon a soft sound at 750 Hz. The masking effect of a sound is defined by its "masking skirt," which is explained below.

The encoder defines maskers and masking skirts based on the above noted masking effects (as explained below in more detail). If masking does occur, then the compression technique will filter out the masked (redundant) sound.

The audio compression technique of the encoder is also premised on the assumption that there are two kinds of sound maskers. These two types of sound maskers are known as tonal and noise maskers. A tonal masker will arise from audio signals that generate nearly pure, harmonically rich tones or signals. A tonal masker that is pure (extremely clear), will have a narrow bandwidth. The band width of a tonal masker varies with frequency. In particular, tones at high frequency may have a wider bandwidth than low frequency tones. For instance, a sound centered at 200 Hz with a width of 50 Hz may not be considered a tone, while a sound centered at 7000 Hz with a width of 200 Hz could be considered a tone. Many sounds have no single dominant frequency (tonal), but instead are more "noise" like. If a sound is wide in bandwidth, with respect to its center frequency, then the sound is classified as noise and may give rise to a noise masker. A noise masker will arise from signals that are not pure. Because noise maskers are not pure, they have a wider bandwidth and appear in many frequencies and will mask more than the tonal masker.

Figure 16:
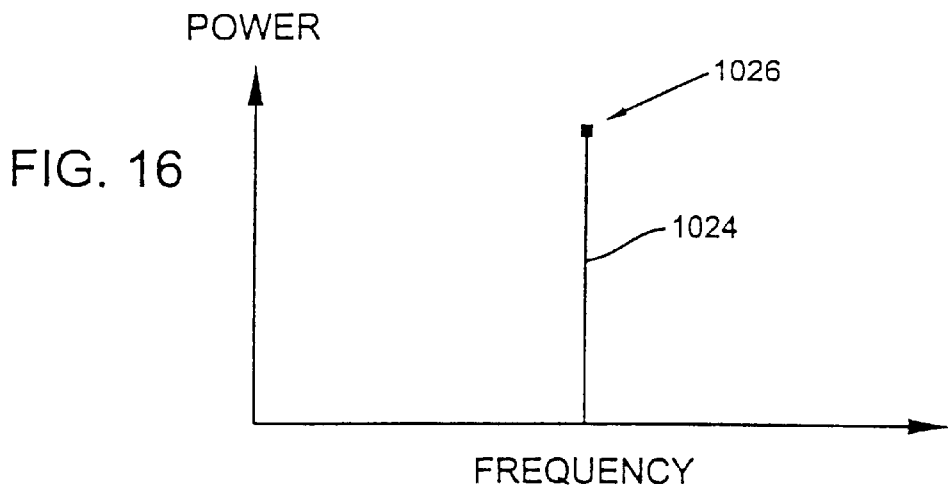
FIG. 16 is a diagram illustrating a known representation of a tonal masker as received and recognized by a CODEC system.

FIG. 16 illustrates a tonal masker 1024 as a single vertical line at a frequency which remains constant as the power increases to the peak power 1026. By way of example, the tonal masker may have 46 HZ bandwidth. Sounds within that bandwidth, but below the peak power level 1026 are "masked." An instrument that produces many harmonics, such as a violin or a trumpet, may have many such tonal maskers. The method for identifying tonal maskers and noise maskers is described in the ISO Document and the '484 patent referenced above.

FIG. 17 shows a tonal masker 1024 with its associated masking skirt 1028. The masking skirt 1028 represents a threshold indicating which signals will be masked by the tonal masker 1024. A signal that falls below the masking skirt 1028 (such as the signal designated 1030) cannot be heard because it is masked by the tone masker 1024. On the other hand, a smaller amplitude tone (such as tone 1032) can be heard because its amplitude rises above the masking skirt 1028.

As shown in FIG. 17, the closer in frequency a signal is to the tonal masker 1024 the greater its amplitude may be and still be masked. Signals that have very different frequencies from the masker 1024, such as signal 1032, may have a lower amplitude and not fall below the masking skirt 1028, nor be masked.

Another aspect of hearing and psycho-acoustics is that a person can hear two tones at the same frequency provided that the softer tone is close enough in amplitude to the louder tone. The maximum difference in amplitude between the two tones of common frequency is referred to as the masking index. The masking index is dependent, in part, upon frequency of the tones. Generally, the masking index increases with frequency. For instance, the masking index of a masking tone at 1000 Hz will be smaller than the masking index of a masking tone at 7000 Hz.

FIG. 17 illustrates the masking index 1034 for the tonal masker 1024. The masking index 1034 is the distance from the peak 1026 of the tonal masker 1024 to the top 1036 of the masking skirt 1028. This distance is measured in dB. For purposes of illustration, the graphs in FIGS. 16–19 scale the frequency along the modules of the graph in Bark. Each Bark corresponds to a frequency band distinguished by the human auditory system (also referred to as a "critical band"). The human ear divides the discernable frequency range into 24 critical bands. The frequency in psycho-acoustics is often measured in Bark instead of Hertz. There is a simple function that relates Bark to Hertz. The frequency range of 0 to 20,000 Hertz is mapped nonlinearly onto a range of approximately 0 to 24 Bark, according to a known function.

At low frequencies, the human ear/brain has the ability to discern small differences in the frequency of a signal if its frequency is changed. As the frequency of a signal is increased, the ability of the human ear to discern differences between two signals with different frequencies diminishes. At high frequencies, a signal must change by a large value before the human auditory system can discern the change.

As noted above, signals which lack a dominant frequency may be produce noise maskers. A noise masker is constructed by summing all of the audio energy within 1 Bark (a critical band) and forming a single discrete "noise" masker at the center of the critical band. Since there are 24 Bark (critical bands) then there are 24 noise maskers. The noise maskers are treated just like the tonal maskers. This means that they have a masking index and a masking skirt. It is known that an audio signal may or may not have tonal maskers 1024, but it will generally have 1024 noise maskers.

Figure 18:
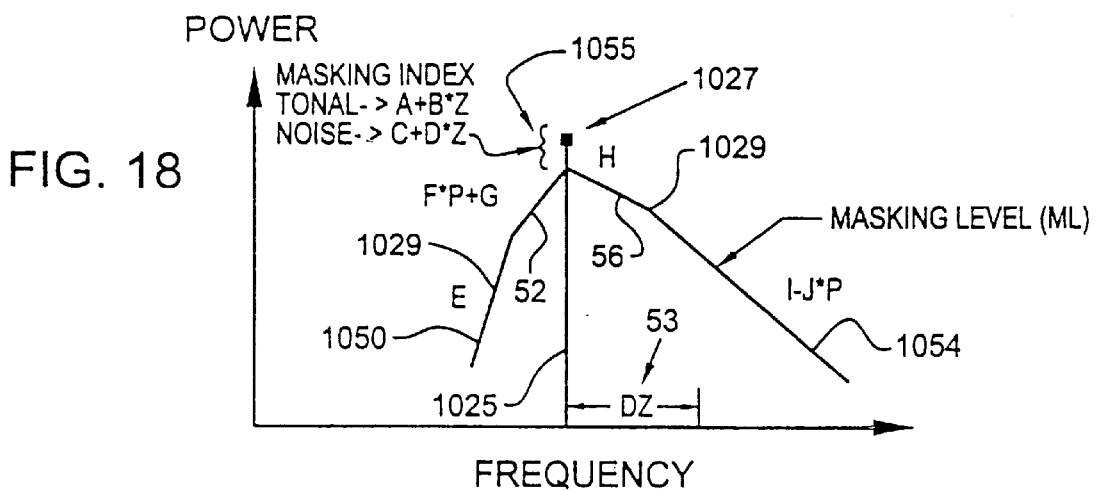
FIG. 18 is a diagram illustrating a tonal masker and its associated masking skirts as implemented by the encoder of the system in accordance with the preferred embodiment shown in FIG. 14.

FIG. 18 illustrates a masking skirt 1029 similar to that described in the ISO/MPEG Layer-II for psycho-acoustic model I. The masking skirt 1029 is more complex than that of FIG. 17. The masking skirt 1029 includes four mask portions 1050, 1052, 1054, and 1056, each of which has a different slope. The mask portions 1052–1056 are defined by the following equations:

1) Skirt Portion 1050=E;
2) Skirt Portion 1052=F*P+G;
3) Skirt Portion 1054=H; and
4) Skirt Portion 1056=I−J*P, wherein the variables E1 F, G, H, I and J represent psycho-acoustic parameters which are initially defined in preset tables, but may be adjusted by the user as explained below. The variable P represents the amplitude 1027 of the masker 1025 to which the masking skirt 1029 corresponds. Thus, the slopes of the mask portions 1050–1056 depend on the amplitude P of the masker 1025. The distance DZ, indicated by the number 1053, represents the distance from the masker 1025 to the signal being masked. As the distance DZ increased between the masker 1029 and the signal to be masked, the masker 1029 is only able to cover up lower and lower amplitude signals. The masking index, AV) indicated by the number 1055, is a function of the frequency. The masking index 1055 for tonal and noise maskers are calculated based on the following formula:

5) AVTonal=A+B*Z; and
6) AVNoise=C+D*Z;

wherein the variables A, B, C and D represent psycho-acoustic parameters and the variable Z represents the frequency of the masker in Bark. The parameters A–J and suggested values therefor have been determined by readily available psycho-acoustic studies. A summary of such studies is contained in the book by Zweiker and Fastl entitled "Psycho-acoustics," which is incorporated herein by reference.

ISO/MPEG Layer-II

Figure 5:
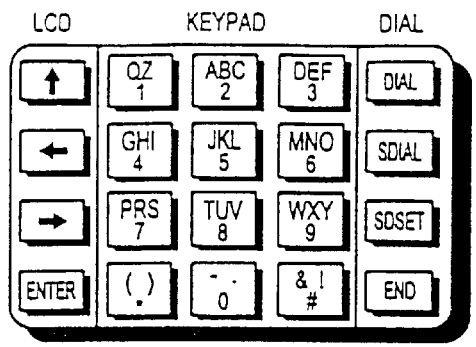
FIG. 5 is an example of a front panel user keypad layout in accordance with a preferred embodiment of the present invention.

The CODEC 1010 utilizes the psycho-acoustical model as described in the ISO psycho-acoustical model I as the basis for its parameters. The ISO model I has set standard values for ten model parameters (A, B, J). These model parameters are described below:

A=6.025 dB
B=0.275 dB/Bark
C=2.025 dB
D=0.175 dB/Bark
E=17.0 dB/Bark
F=0.4 1/Bark
G=6.0 dB/Bark
H=17.0 dB/Bark
I=17.0 dB/Bark
J=0.15 1/Bark Parameters A through J are determined as follows:

Z=freq in Bark
DZ=distance in Bark from master peak (may be + or −) as shown in FIG. 5
Pxx(Z(k))=Power in SPL(96 db=+/−32767) at frequency Z of masker K
xx tm for tonal masker or nm for noise masker
Pxx is adjusted so that a full scale sine wave (+/−32767) generates a Pxx of 96 db.
Pxx=XFFT+96.0 where XFFT=0 db at +/−32767 amplitude
XFFT is the raw output of an FFT. It must be scaled to convert it to Pxx
AVtm(k)=A+B*Z(k) Masking index for tonal masker k
AVnm(k)=C+D*Z(k) Masking index for tonal masker k
VF(k) DZ)=E*(|DZ|−1)+(F*X(Z(k))+G)
VF(k, DZ)=(F*X(Z(k))+G)*|DZ|
VF(k, DZ)=H*DZ
VF(k, DZ)=(DZ−1)*(I−J*X(Z(k)))+H
MLxx(k, DZ)=Pxx(k)−(AVxx(K)+VF(k, DZ))
MLxx is the masking level generated by each masker k at a distance DZ from the masker.
where xx=tm or nm
Pxx=Power for tm or nm Parameters A through J are shown in FIG. 15. Parameters A through i are fully described in the ISO 11172-3 document.

Additional Parameters Added to ISO/XPEG LAYER-II

In addition to parameters A–J, the CODEC 1010 may use additional parameters K–Z and KK–NN. The CODEC 1010 allows the user to adjust all of the parameters A–Z and KK–NN. The additional parameters K–Z and KK–NN are defined as follows:

Parameter K—Joint Ssterero Sub-band Minimum Value

This parameter ranges from 1 to 3 1 and represents the minimum sub-band at which the joint stereo is permitted. The ISO specification allows joint stereo to begin at sub-band 4, 8, 12, or 16. Setting K to 5 would set the minimum to 8. Setting this parameter to I would set the minimum sub-band for joint stereo to 4.

Parameter L—Anti-correlation Joint Stereo Factor

This parameter attempts to determine if there is a sub-band in which the left and right channels have high levels, but when summed together to form mono, the resulting mono mix has very low levels. This occurs when the left and right signals are anticorrelated. If anti-correlation occurs in a subband, joint stereo which includes that sub-band cannot be used. In this case, the joint stereo boundary must be raised to a higher sub-band. This will result in greater quantization noise but without the annoyance of the anti-correlation artifact. A low value of L indicates that if there is a very slight amount of anti-correlation, then move the sub-band boundary for joint stereo to a higher valve.

Parameter M—Limit Sub-bands

This parameter can range from 0 to 31 in steps of 1. It represents the minimum number of sub-bands which receive at least the minimum number of bits. Setting this to 8.3 would insure that sub-bands 0 through 7 would receive the minimum number of bits independent of the psycho-acoustic model. It has been found that the psycho-acoustic model sometimes determines that no bits are required for a sub-band and using no bits as the model specifies, results in annoying artifacts. This is because the next frame might require bits in the sub-band. This switching effect is very noticeable and annoying. See parameter { for another approach to solving the sub-band switching problem.

Parameter N—Demand/Constant Bit Rate

This is a binary parameter. If it is above 0.499 then the demand bit rate bit allocation mode is requested. If it is below 0.499 then the fixed rate bit allocation is requested. If the demand bit rate mode is requested, then the demand bit rate is output and can be read by the computer. Also, see parameter R, operating the CODEC in the demand bit rate mode forces the bits to be allocated exactly as the model requires. The resulting bit rate may be more or less than the number of bits available. When demand bit rate is in effect, then parameter M has no meaning since all possible sub-bands are utilized and the required number of bits are allocated to use all of the sub-bands.

In the constant bit rate mode, the bits are allocated in such a manner that the specified bit rate is achieved. If the model requests less bits than are available, any extra bits are equally distributed to all sub-bands starting with the lower frequency sub-bands.

Parameter O—Safety Margin

This parameter ranges from −30 to +30 dB. It represents the safety margin added to the psycho-acoustic model results. A positive safety margin means that more bits are used than the psycho-acoustic model predicts, while a negative safety margin means to use less bits than the psycho-acoustic model predicts. If the psycho-acoustic model was exact, then this parameter would be set to 0.

Parameter P—Joint Stereo Scale Factor Mode

This parameter ranges from 0 to 0.999999. It is only used if joint stereo is required by the current frame. If joint stereo is not needed for the frame, then this parameter is not a used. The parameter p is used in the following equation:

$$br = \text{demand bit rate} * p$$

If br is greater than the current bit rate (128, 192, 256, 384) then the ISO method of selecting scale factors is used. The ISO method reduces temporal resolution and requires less bits. If br is less than the current bit rate, then a special method of choosing the scale factors is invoked. This special model generally requires that more bits are used for the scale factors but it provides a better stereo image and temporal resolution. This is generally better at bit rates of 192 and higher. Setting p to 0 always forces the ISO scale factor selection while setting p to 0.9999999 always forces the special joint stereo scale factor selection.

Parameter Q—Joint Stereo Boundary Adjustment

This parameter ranges from −7 to 7, and represents an adjustment to the sub-band where joint stereo starts. For example, if the psycho-acoustic model chooses 14 for the start of the joint stereo and the Q parameter is set to −3, the joint boundary set to 11 (14−3). The joint bound must be 4, 8, 12 or 16 so the joint boundary is rounded to the closest value which is 12.

Parameter R—Demand Minimum Factor

This value ranges from 0 to 1 and represents the minimum that the demand bit rate is allowed to be. For example, if the demand bit rate mode of bit allocation is used and the demand bit rate is set to a maximum of 256 kbs and the R parameter is set to 0.75 then the minimum bit rate is 192 kbs (256*0.75). This parameter should not be necessary if the model was completely accurate. When tuning with the demand bit rate, this parameter should be set to 0.25 so that the minimum bit rate is a very low value.

Parameter S—Stereo Used Sub-bands

This parameter ranges from 0 to 31 where 0 means use the default maximum (27 or 30) subbands as specified in the ISO specification when operating in the stereo and dual mono modes. If this parameter is set to 15, then only sub-bands 0 to 14 are allocated bits and sub-bands 15 and above have no bits allocated. Setting this parameter changes the frequency response of the CODEC. For example, if the sampling rate is 48,000 samples per second, then the sub-bands represent 750 HZ of bandwidth. If the used sub-bands is set to 20, then the frequency response of the CODEC would be from 20 to 15000 HZ (20*750).

Parameter T—Joint Frame Count

This parameter ranges from 0 to 24 and represents the minimum number of MUSICAMO frames (24 millisecond for 48 k or 36 ms for 32 k) that are coded using joint stereo. Setting this parameter non-zero keeps the model from switching quickly from joint stereo to dual mono. In the ISO model. There are 4 joint stereo boundaries. These are at subband 4, 8, 12 and 16 (starting at 0). If the psycho-acoustic model requires that the boundary for joint stereo be set at 4 for the current frame and the next frame can be coded as a dual mono frame, then the T parameter requires that the boundary be kept at 4 for the next T frames, then the joint boundary is set to 8 for the next T frames and so on. This prevents the model from switching out of joint stereo so quickly. If the current frame is coded as dual mono and the next frame requires joint stereo coding, then the next frame is immediately switched into joint stereo. The T parameter has no effect for entering joint stereo, it only controls the exit from joint stereo. This parameter attempts to reduce annoying artifacts which arise from the switching in and out of the joint stereo Parameter U—Peak/Rms Selection This is a binary parameter. If the value is less than 0.499, then the psycho-acoustic model utilizes the peak value of the samples within each sub-band to determine the number of bits to allocate for that sub-band. If the parameter is greater than 0.499, then the RMS value of all the samples in the sub-band is used to determine how many bits are needed in each sub-band. Generally, utilizing the RMS value results in a lower demand bit rate and higher audio quality.

Parameter V—Tonal Masker Addition

This parameter is a binary parameter. If it is below 0.499 the 3 db additional rule is used for tonals. If it is greater than 0.499, then the 6 db rule for tonals is used. The addition rule specifies how to add masking level for two adjacent tonal maskers. There is some psycho-acoustic evidence that the masking of two adjacent tonal maskers is greater (6 db rule) than simply adding the sum of the power of each masking skirt (3 db). In other words, the masking is not the sum of the powers of each of the maskers. The masking ability of two closely spaced tonal maskers is greater than the sum of the power of each of the individual maskers at the specified frequency. See FIG. 6.

Parameter W—Sub-band 3 Adjustment

This parameter ranges from 0 to 15 db and represents an adjustment which is made to the psycho-acoustic model for sub-band 3. It tells the psycho-acoustic model to allocate more bits than calculated for this sub-band. A value of 7 would mean that 7 db more bits (remember that 1 bit equals 6 db) would be allocated to each sample in sub-band 3. This is used to compensate for inaccuracies in the psycho-acoustic model at the frequency of sub-band 3 (3*750 to 4*750 Hz for 48 k sampling).

Parameter X—Adj Sub-band 2 Adjustment

This parameter is identical to parameter W with the exception that the reference to sub-band 3 in the above-description for parameter W is chanced to sub-band 2 for parameter X.

Parameter Y—Adj Sub-band 1 Adjustment

This parameter is identical to parameter W With the exception that the reference to sub-band 2 in the above-description for parameter W is changed to sub-band 1 for parameter Y.

Parameter Z—adj sub-band 0 adjustment

This parameter is identical to parameter W with the exception that the reference to sub-band 2 in the above-description for parameter W is chanced to sub-band 0 for parameter Z.

Parameter KK—sb hang time

The psycho-acoustic model may state that at the current time, a sub-band does not need any bits. The KK parameter controls this condition. If the parameter is set to 10, then if the model calculates that no bits are needed for a certain sub-band, 10 consecutive frames must occur with no request for bits in that sub-band before no bits are allocated to the sub-band. There are 32 counters, one for each sub-band. The KK parameter is the same for each sub-band. If a sub-band is turned off, and the next frame needs bits, the subband is immediately turned on. This parameter, is used to prevent annoying switching on and off of sub-bands. Setting this parameter nonzero results in better sounding audio at higher bit rates but always requires more bits. Thus, at lower bit rates, the increased usage of bits may result in other artifacts.

Parameter LL—joint stereo scale factor adjustment

If this parameter is less than 0.49999, then scale factor adjustments are made. If this parameter is 0.5000 or greater, then no scale factor adjustments are made (this is the ISO mode). This parameter is used only if joint stereo is used. The scale factor adjustment considers the left and right scale factors a pair and tries to pick a scale factor pair so that the stereo image is better positioned in the left/right scale factor plane. The result of using scale factor adjustment is that the stereo image is significantly better in the joint stereo mode.

Parameter MM—Mono Used Sub-bands

This parameter is identical to parameter S except it applies to mono audio frames.

Parameter NN Joint Stereo Used Sub-bands

This parameter is identical to parameter S except it applies to joint stereo audio frames.

As the psycho-acoustic parameters affect the resultant quality of the audio output, it would be advantageous for users to vary the output according to the user's desires.

In a preferred embodiment of the disclosed CODEC 1010, the psycho-acoustic parameters can be adjusted by the user through a process called dynamic psycho-acoustic parameter adjustment (DPPA) or tuning. The software for executing DPPA is disclosed in the incorporated Software Appendix and discussed in more detail below in connection with FIGS. 21–32. DPPA offers at least three important advantages to a user of the disclosed CODEC over prior art CODECS. First, DPPA provides definitions of the controllable parameters and their effect on the resulting coding and compression processes. Second, the user has control over the settings of the defined DPPA parameters in real time. Third, the user can hear the result of experimental changes in the DPPA parameters. This feedback allows the user to intelligently choose between parameter alternatives.

Tuning the model parameters is best done when the demand bit rate is used. Demand bit rate is the bit rate calculated by the psycho-acoustic model. The demand bit rate is in contrast to a fixed bit rate. If a transmission facility is used to transmit compressed digital audio signals, then it will have a constant bit rate such as 64, 128, 192, 256 . . . kbs. When tuning the parameters while using the Parameter N described above, it is important that the demand bit rate is observed and monitored. The model parameters should be adjusted for the best sound with the minimum demand bit rate. Once the parameters have been optimized in the demand bit rate mode, they can be confirmed by running in the constant bit rate mode (see Parameter N).

DPPA also provides a way for the user to evaluate the effect of parameter changes. This is most typically embodied in the ability for the user to hear the output of the coding technique as changes are made to the psycho-acoustic parameters. The user can adjust a parameter and then listen to-the resulting change in the audio quality. An alternate embodiment may incorporate measurement equipment in the CODEC so that the user would have an objective measurement of the effect of parameter adjustment on the resulting audio. Other advantages of the disclosed invention with the DPPA are that the user is aware of what effect the individual parameters have on the compression decompression scheme, is able to change the values of parameters, and is able to immediately assess the resulting effect of the current parameter set.

One advantage of the ability to change parameters in the disclosed CODEC, is that the changes can be accepted in real time. In other words, the user has the ability to change parameters while the audio is being processed by the system.

In the preferred embodiment, the compression scheme (attached as the Software Appendix) includes thirty adjustable parameters. It is contemplated that additional parameters can be added to the CODEC to modify the audio output. Provisions have been made in the CODEC for these additional parameters.

Figure 19:
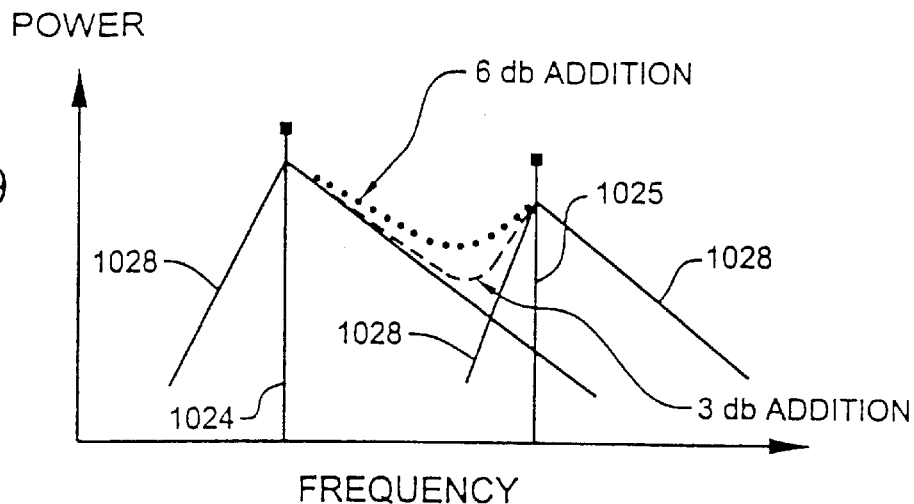
FIG. 19 is a diagram illustrating the representation of the addition of two tonal maskers as implemented by the encoder of the system in accordance with the preferred embodiment shown in FIG. 14.

Turning now to FIG. 19, one can see two tonal maskers 1024 and 1025. The individual masking skirts for these maskers are shown in 1028. The encoder predicts how do these individual maskers mask a signal in the region in between 1024 and 1025. The summing of the masking effects of each of the individual maskers may be varied between two methods of summing the effects of tonal maskers. These methods are controlled by Parameter V described above.

Figure 20:
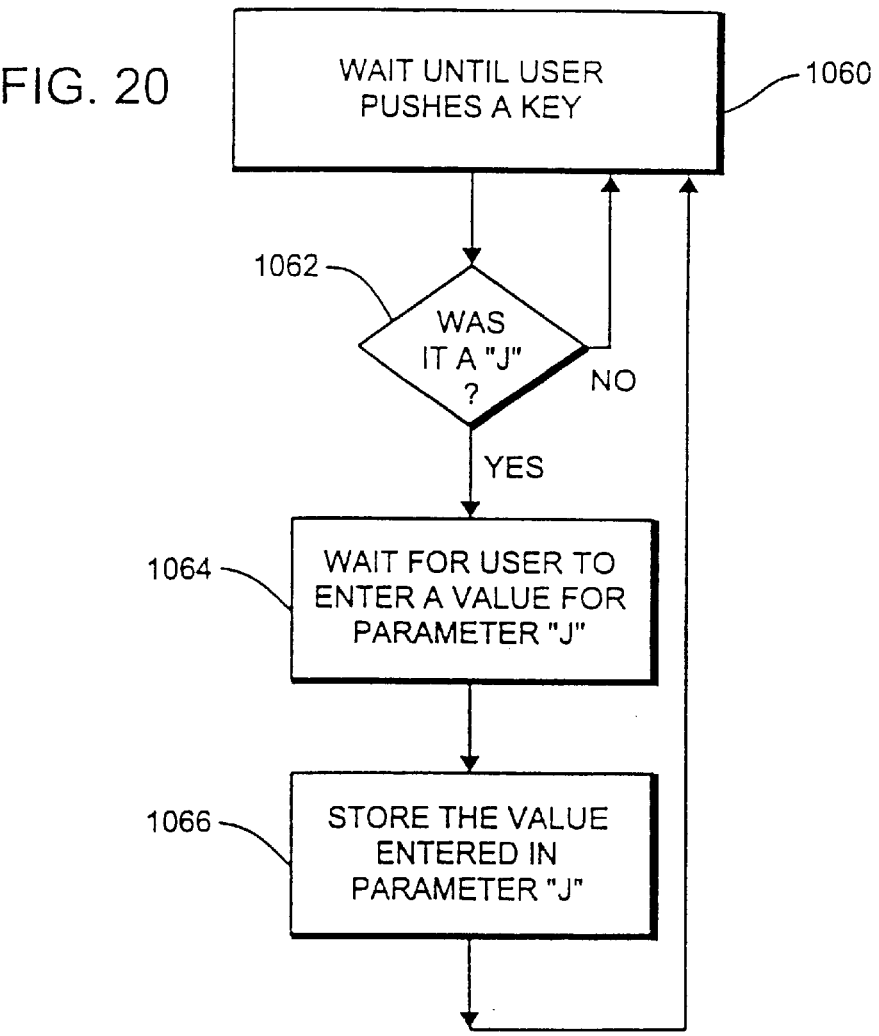
FIG. 20 is a block diagram illustrating the adjustment of a single parameter as performed by the encoder of the system in accordance with the preferred embodiment shown in FIG. 14.

FIG. 20 is illustrative of the steps the user must take to modify each parameter. As shown in FIG. 20, the parameters are set to their default value (which may be obtained from one of several stored table) and remain at that value until the user adjusts the parameter. The user may change the parameter by turning one of the knobs, pushing one key on the keypad, or changing one of the graphics representative of one of the parameters on the computer monitor. Thus, as shown in box 1060, the disclosed CODEC 1010 waits until the user enters a command directed to one of the parameters. The CODEC 1010 then determines which parameter had been adjusted. For example, in box 1062 the CODEC inquires whether the parameter that was modified was parameter J. If parameter J was not selected, the CODEC 1010 then returns to box 1060 and awaits another command from the user. If parameter J was selected, the CODEC 1010 awaits for the user to enter a value for that parameter in box 1064. Once the user has entered a value for that parameter, the CODEC 1010, in box 1066, stores that new value for parameter J. The values for the default parameters are stored on a storage medium in the encoder 1012, such as a ROM or other chip.

Turning again to FIGS. 14 and 15 (which generally illustrate the operation of the disclosed CODEC)—an analog audio source 1016 is fed into the encoder/decoder (CODEC) 1010 which works in loop back mode (where the encoder directly feeds the decoder). Parametric adjustments can be made via a personal computer 1040 attached to the CODEC 1010 from an RS232 port (not shown) attached to the rear of the CODEC. A cable 1042 which plugs into the RS232 port, connects into a spare port (not shown) on the PC 1040 as shown in FIG. 14. The personal computer 1040 is preferably an IBM-PC or IBM-PC clone, but can be any personal computer including a Macintosh™. The personal computer 1040 should be at least a 386DX-33, but is preferably a 486 or better. The PC should have a VGA monitor or the like. The preferred personal computer 1040 should have at least 4 mb of memory, a serial corn port, a mouse, and a hard drive.

Once the PC 1040 is connected to the CODEC 1010, a tuning file can be loaded onto the personal computer 1040, and then the parameters can be sent to the encoder via a cable 1042. A speaker 1044 is preferably attached to the output of the CODEC 1010, via cable 1046, to give the user real time output. As a result, the user can evaluate the results of the parameter adjustment. A headphone jack (not shown) is also preferably included so that a user can connect headphones to the CODEC and monitor the audio output.

The parameters can be adjusted and evaluated in a variety of different ways. In the preferred embodiment, a mouse is used to move a cursor to the parameter that the user wishes to adjust. The user then holds down the left mouse button and drags the fader button to the left or right to adjust the parameter while listening to the audio from the speaker 1044. For example, if the user were to move the fader button for parameter J to the extreme right, the resulting audio would be degraded. With this knowledge of the system, parameter J can be moved to test the system to insure that the tuning program is communicating with the encoder. Once the user has changed all or some of the parameters, the newly adjusted parameters can be saved.

In another embodiment, control knobs or a keypad (not shown), can be located on the face of the CODEC 1010 to allow the user to adjust the parameters. The knobs would communicate with the tuning program to effectuate the same result as with the fader buttons on the computer monitor. The attachment of the knobs can be hard with one knob allotted to each adjustable parameter, or it could be soft with a single knob shared between multiple parameters.

In another embodiment, a graphic representing an "n" dimensional space with the dimensions determined by the parameters could be shown on the computer display. The operator would move a pointer in that space. This would enable several parameters to be adjusted simultaneously. In still another embodiment, the parameters can be adjusted in groups. Often psycho-acoustic parameters only make sense when modified in groups with certain parameters having fixed relationships with other parameters. These groups of parameters are referred to as smart groups. Smart group adjustment would mean that logic in the CODEC would change related parameters (in the same group) when the user changes a given parameter. This would represent an acceptable surface in the adjustable parameter space.

In yet another embodiment, a digital parameter read out may be provided. This would allow the values of the parameters to be digitally displayed on either the CODEC 1010 or the PC 1040. The current state of the CODEC 1010 can then be represented as a simple vector of numbers. This would enable the communication of parameter settings to other users.

Parameter adjustment can be evaluated in ways other than by listening to the output of speaker 1044. In one embodiment, the CODEC 1010 is provided with an integrated FFT analyzer and display, such as shown in applicant's invention entitled "System For Compression And Decompression Of Audio Signals For Digital Transmission," and the Software Appendix that is attached thereto, that are both hereby incorporated by reference. By attaching the FFT to the output of the CODEC, the user is able to observe the effect of parametric changes on frequency response. By attaching the FFT to the input of the CODEC, the user is able to observe frequency response input. The user can thus compare the input frequency response to the output frequency response. In another embodiment, the disclosed CODEC 1010 is provided with test signals built into the system to illustrate the effect of different parameter adjustments.

In another embodiment, the DPPA system may be a "teaching unit." To determine the proper setting of each parameter, once the determination is made, then the teacher could be used to disburse the parameters to remote CODECs (receivers) connected to it. Using this embodiment, the data stream produced by the teaching unit is sent to the remote CODEC that would then use the data stream to synchronize their own parameters with those determined to be appropriate to the teacher. This entire system thus tracks a single lead CODEC and avoids the necessity of adjusting the parameters of all other CODECs in the network of CODECS.

Processing Flows of the Preferred Embodiment

Next, the processing flow of the preferred embodiment is described in connection with FIGS. 21–33.

Figure 21:
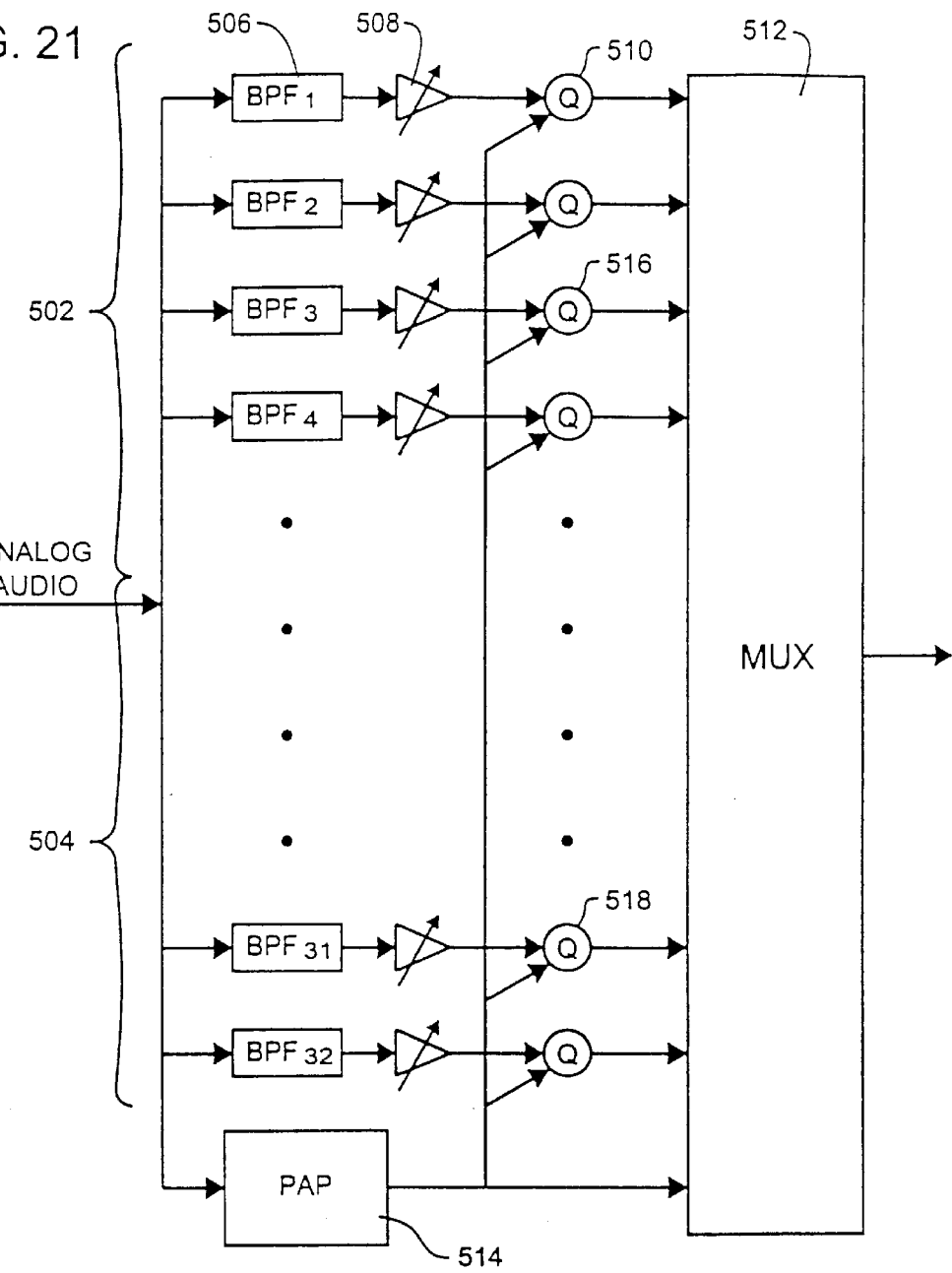
FIG. 21 illustrates a block diagram of an encoder for a single audio channel according to the present invention.

FIG. 21 generally illustrates the functions of an encoder for a single channel receiving audio signal. The encoder includes a plurality of band pass filters separately divided into a low pass filter bank 502 and a high pass filter bank 504. The low and high pass filter banks 502 and 504 include a plurality of band pass filters 506. The number of band pass filters in each filter bank may be dynamically varied during joint stereo framing by the psycho-acoustic processor as explained below. For purposes of illustration, four filters have been dynamically assigned to the low pass filter bank 502, and the remaining filters have been assigned to the high pass filter bank 504. The band pass filters 506 receive a segment of predefined length (e.g., 24 ms) of an incoming analog audio signal and pass corresponding subbands thereof. Each band pass filter 506 is assigned to a separate pass band having a unique center frequency and a corresponding bandwidth. The widths of each pass band may differ; for instance, whereby the band pass filters for low frequency signals have narrower pass bands than the pass bands of filters corresponding to high frequency signals. The band pass filters are defined such that the pass bands slightly overlap.

The subband signals output by the band pass filters 506 are delivered to corresponding scalers 508 which adjust the gain of the subband signals and deliver same to corresponding quantizers 510. The subband signals received by each scaler 508 are divided into a predetermined number of blocks (e.g. three blocks each of which is 8 milliseconds in length for a 24 millisecond segment of audio data). The scalers 508 adjust the gain of the corresponding subband signal for each block within a segment until the peak to peak amplitude of the subband signal substantially corresponds to the range of the quantizer 510. The gain of the subband signal is controlled by the scaler 508 to ensure that the peak to peak amplitude never exceeds the capacity of the quantizer 510. By way of example, each subband signal delivered from a band pass filter 506 may include 36 samples divided into three blocks of 12 samples. The scaler 508 adjusts the gain of the 12 sample blocks as explained above to ensure that the quantizer 510 is fully loaded. The quantizer 510 has a maximum quantization capacity. The quantizers 510 convert the incoming samples to one of a predefined number of discrete levels and outputs a corresponding digital signal representative of the closest quantization level to the sample level. The number and distance between quantization levels is governed by the number of bits allocated to the quantizer 510. For instance, the quantizer 510 will use more quantization levels if afforded 10 bits per sample as compared to the number of quantization levels which correspond to 6 bits per sample. As more bits are assigned to the quantizer, the sample is more accurately digitized and less noise is introduced. The quantizers 510 deliver output quantized subband signals to a multiplexer 512, which combines the subband signals to form a frame of data which is ultimately transmitted by the encoder.

A psycho-acoustic processor (PAP) 514 process the incoming analog audio signal (as explained below) and controls the quantizers 510 and scalers 508 to allocate the minimum necessary number of bits to each quantizer. In accordance with the process explained below, the PAP 514 may direct the quantizer 516 to utilize six bits per sample, while limiting quantizer 518 to two bits per sample.

Figure 22:
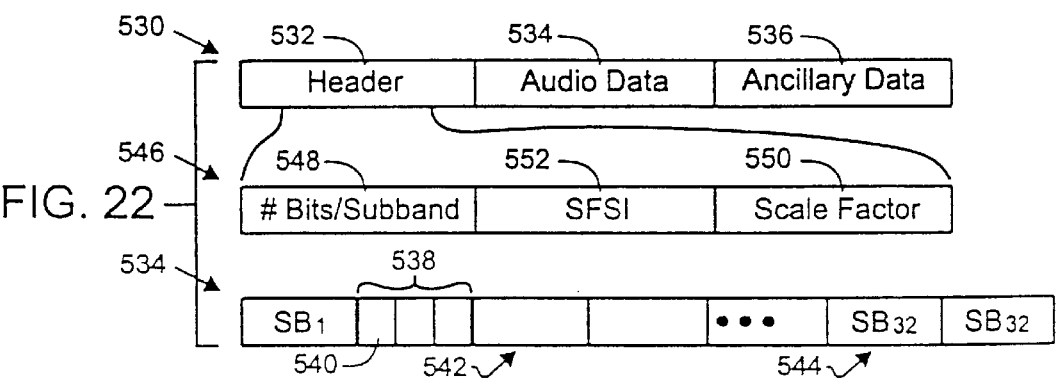
FIG. 22 illustrates a data structure used in the preferred embodiment for a frame of data.

FIG. 22 generally illustrates a frame 530 having a header segment 532, a data segment 534, and an ancillary data segment 536. The data segment 534 includes multiple subband components 538, each of which corresponds to a unique subband (SB–SB332). Each subband component 538 is divided into three blocks 540, each of which has been scaled by the scaler 508 to properly load the quantizer 510. It is to be understood that the blocks 540 and subband components 538 will vary in length depending upon the number of bits used by the corresponding quantizer 510 to encode the corresponding subband signal. For instance, when quantizer 516 is directed (by the path 514) to use six bits per sample, the corresponding data component 542 will include 18 bits of data (six bits per block). However, when quantizer 518 is assigned two bits per sample, data component 544 will include six bits (two bits per block). The audio data segment 534 has a fixed maximum length, and thus a limited number of bits are available for use by the quantizers 510. The PAP 514 maximizes the bit allocation between the quantizers 510.

Once the bit allocation is complete, the PAP 514 loads the corresponding subsection and the header segment 532 with the corresponding encoder information 546. The encoder information 546 includes the number of bits allocated to each quantizer 510 for the corresponding subband (referred to hereafter as the "Bit Allocation Information 548). The encoder information 546 further includes the scaling factors 550 used by the scalers 508 in connection with corresponding blocks 540 of corresponding subband components 538. In addition, the encoder information 546 includes scaling factor sample information 532 (explained below).

Figure 23:
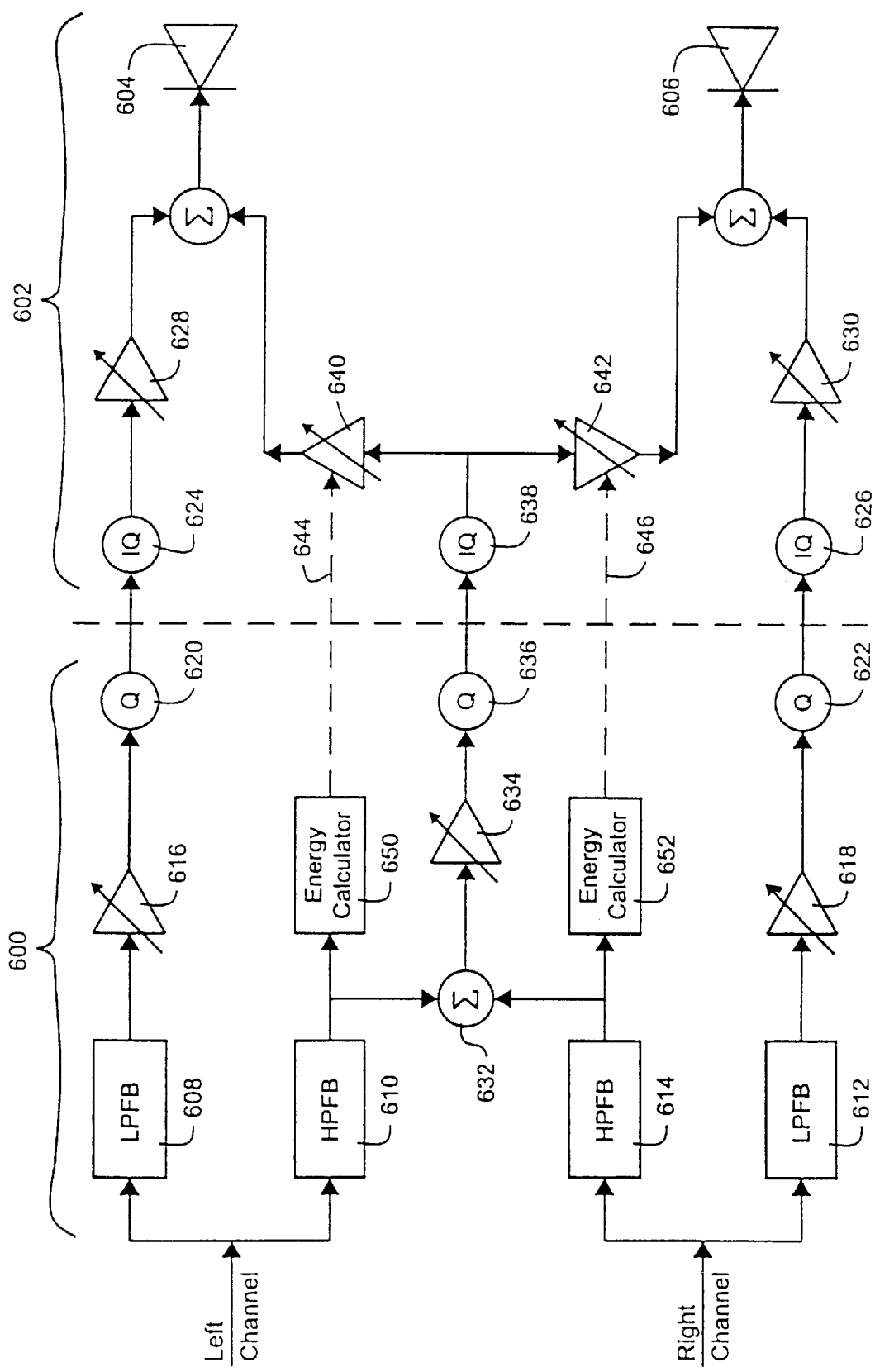
FIG. 23 illustrates a block diagram of an encoder for two audio channels operated in joint stereo according to the present invention.

FIG. 23 illustrates an encoder including the structure of the encoder from FIG. 21, with the further ability to offer joint stereo at a decoder output. In FIG. 23, the encoder is generally denoted by block 600, and the decoder is denoted by block 602. The encoder 600 receives a stereo signal upon left and right channels. The decoder 602 outputs a joint stereo signal at speakers 604 and 606. The encoder 600 includes low pass filter banks (LPFB) 608 and 612 corresponding to the left and right channels, respectively. The encoder 600 further includes high pass filter banks (HPFB) 610 and 614, also corresponding to the left and right channels, respectively. The low and high pass filter banks 608–614 include a plurality of band pass filters which are controlled by a PAP, as explained in connection with FIG. 21. The output signals of the low pass filter banks 608 and 612 are delivered to scaler banks 616 and 618, each of which also include a plurality of scalers which operate in a manner similar to the scalers 508 in FIG. 21. The scaler banks 616 and 618 deliver scaled signals to quantizer banks 620 and 622, each of which similarly includes a plurality of quantizers similar to quantizers 510 in FIG. 21.

While not showing, it is understood that the filter banks 616 and 618 and the quantizers 620 and 622 control led by a PAP similar to the psycho-acoustic processor 514 in FIG. 21. The low pass filter banks 608 and 612, scaler banks 616 and 618, and quantizer banks 620 and 622 cooperate to separately encode the lower subbands for the left and right channels of the stereo input signal. The encoded signals for the lower subbands are in turn delivered from the quantizers 620 and 622 and ultimately received by corresponding inverting quantizers 624 and 626. The inverting quantizers 624 and 626 cooperate with inverse scaling banks 628 and 630 to reconvert the lower frequency portions of the encoded left and right channel signals back to analog audio.

The encoder 600 further includes a summer 632 which combines the output signals from the high pass filter banks 610 and 614 for the left and right channels to produce a joint mono signal for the higher pass bands. The output of the summer 632 is in turn delivered to a scaling bank 634, which scales the signal to properly load the quantizer bank 636. The output signal of the quantizer bank 636 is delivered to an inverse quantizer 638 to reverse the process. The output of the inverse quantizer 638 is delivered to two scaling banks 640 and 642 which are controlled via control channels 644 and 646.

The encoder 600 further includes calculating modules 650 and 652, which measure the energy in the corresponding high pass subbands. The modules 650 and 652 then adjust the gain of scalers 640 and 642 in proportion to the energy of the corresponding high pass subbands. For instance, if HPFB 610 outputs more energy than HPFB 614, then scaler 640 is set to boost the gain of its input signal greater than the gain boost of scaler 642. Thus, the audio signal in the higher pass bands is output predominantly at speaker 604. The energy calculator 650 and 652 may be carried out by the psycho-acoustic processor in a manner explained below.

Next, the discussion turns to the process followed by the present invention to undergo encoding.

Figure 24:
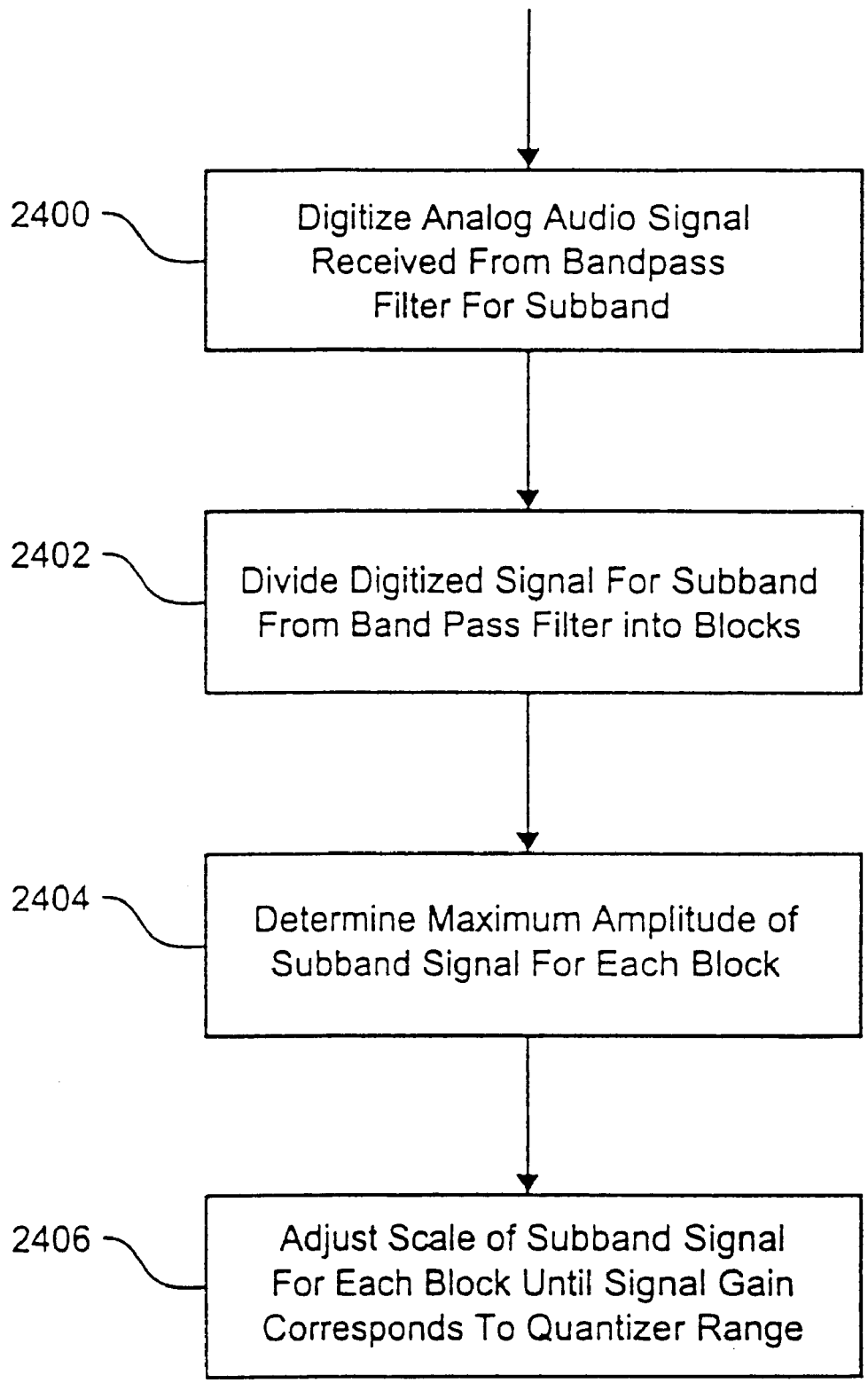
FIG. 24 illustrates a flow diagram of the process followed by the present invention when adjusting the scaling factors.

With reference to FIG. 24, the PAP 514 cooperates with the quantizer 510 and scaler 508 to digitize the analog audio signals received from each band pass fitter 506 for corresponding subbands (step 2400). In step 2402, the digitized signals for the subbands from each bandpass filter are divided into a predefined number of blocks. For example, a 24 millisecond segment of analog audio may be converted to 36 digital samples and then divided into three blocks of 12 samples each. In step 2404, each block of samples is analyzed to determine the maximum amplitude of the digitized signal therein. In step 2406, the scalers 508 are adjusted to vary the scale of the samples within each block until the samples correspond to a signal gain substantially equaling the range of the quantizers 510.

Figure 25A:
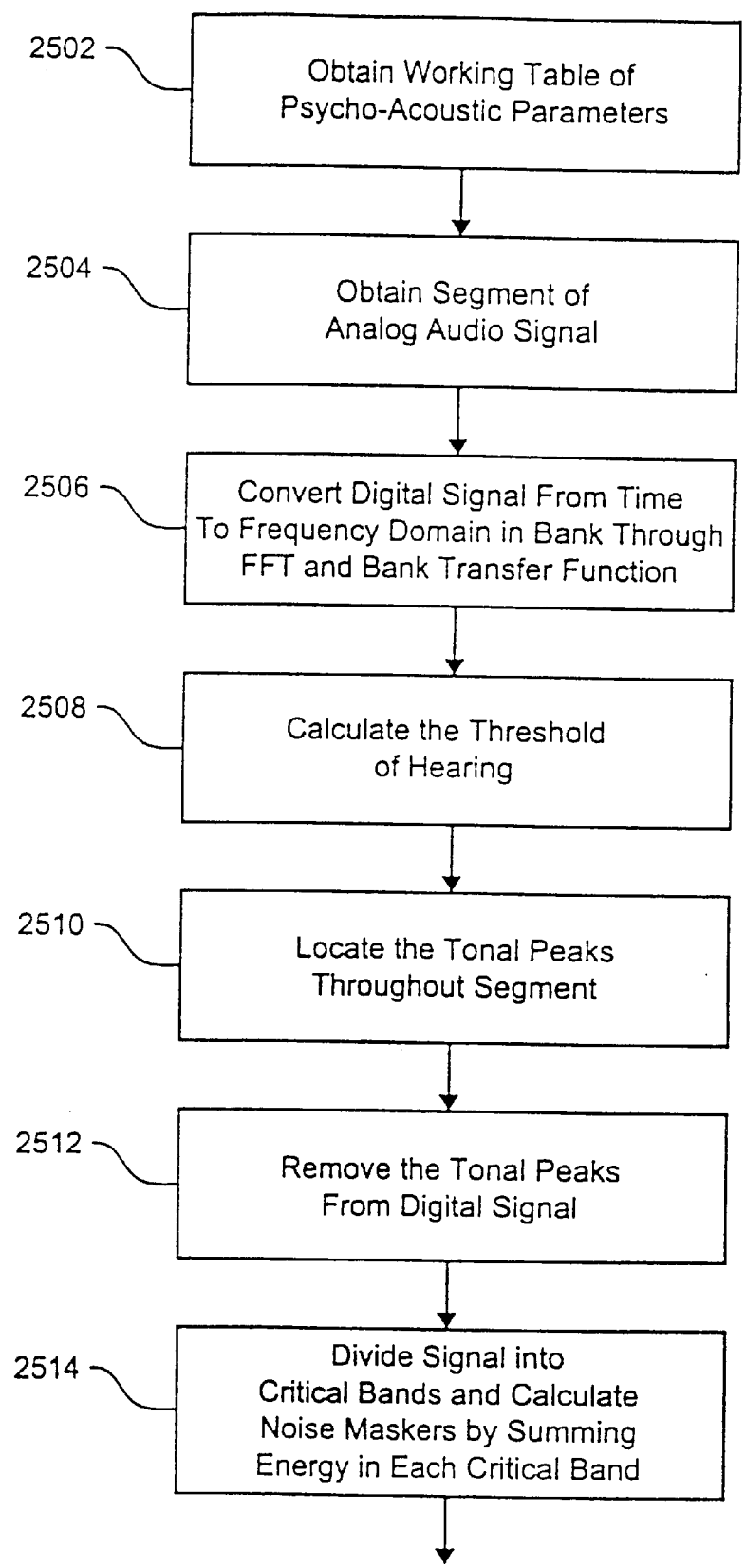
FIGS. 25a and 25b illustrate a flow diagram of the overall process followed by the present invention when assigning encoding levels to the quantizers.
Figure 25B:
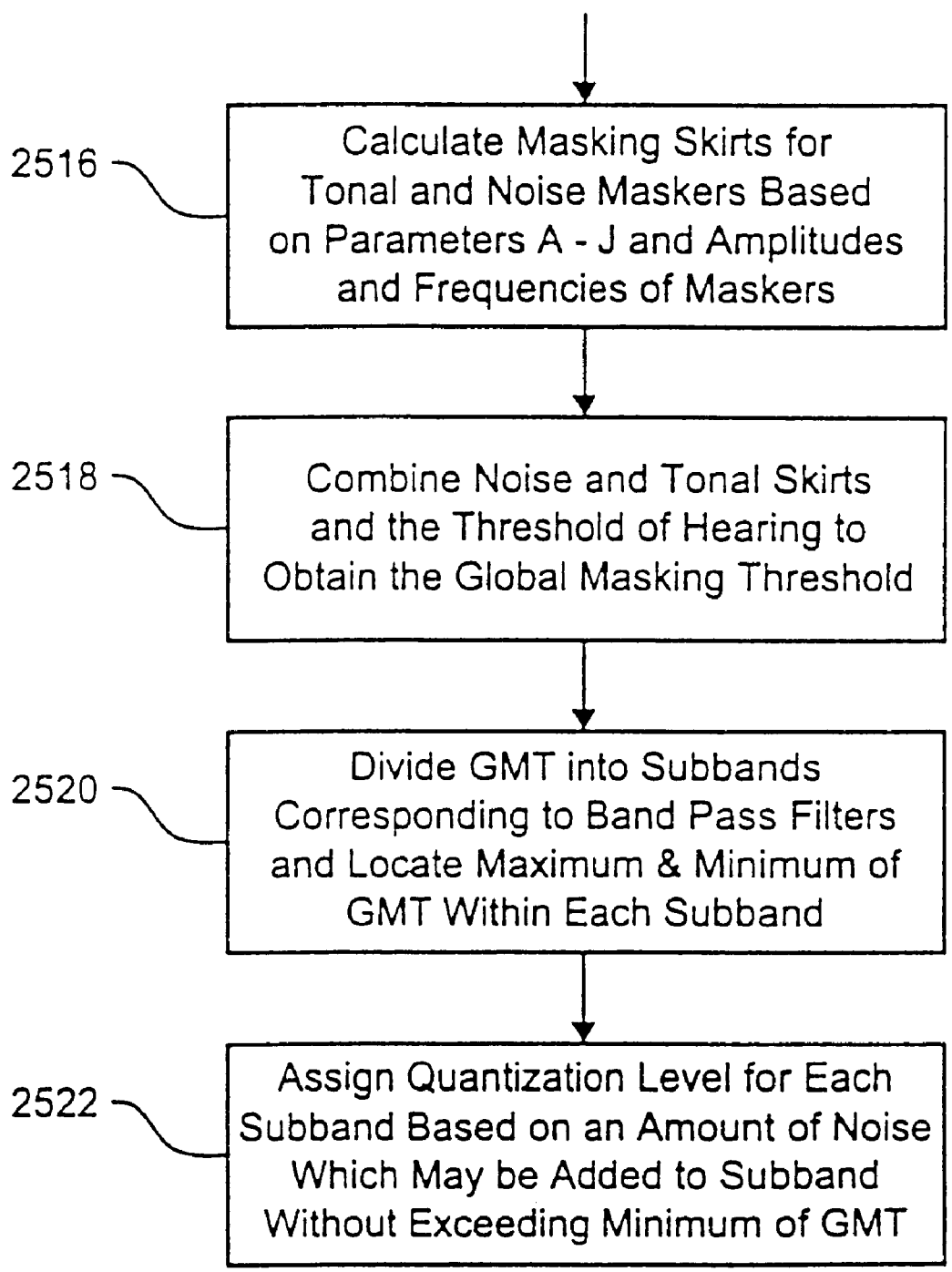

Turning to FIGS. 25A and 25B, while the scalers 508 are being adjusted (as explained in connection with FIG. 24), the PAP 514 calculates the global masking threshold (GMT) to be used in connection with the present sample of analog audio data. Beginning at step 2502, the PAP 514 obtains a working table of psycho-acoustic parameters having a value for each of parameters A–NN (described above). The table of parameters may be one of several predefined tables stored in memory in the encoder. The table is updated dynamically by the user during operation of the encoder. For instance, when the encoder is initially started, an initial set of parameter values may be read from the encoder memory and used to initialize the encoder. Thereafter, as the PAP 514 continuously processes segments of analog audio data, the user may vary the parameter values stored in the working table. Once the user varies a parameter value in the working table, the PAP 514 obtains the new parameter value set for processing the following analog audio segments. For instance, after the user listens to a short segment (one minute) of analog audio encoded and decoded according to the initial working table, the user may desire to adjust the parameters within the working table. Once the user adjusts these parameters, the PAP 514 effects subsequent psycho-acoustic processing based on the new parameter values assigned by the user. Thus, the user is afforded the opportunity to listen to the signal which results from the users adjustment in the parameters.

Returning to FIG. 25A, once the PAP 514 obtains the working table of parameters A–NN, the PAP 514 uses these parameter values for the current segment of audio data. At step 2504, the PAP 514 obtains a segment of analog audio data of; predetermined length (e.g.. 24 milliseconds). The segment is digitized. At step 2506, the PAP 514 converts the digitized segment from the time to the frequency domain according to the bark scale. These conversions may be effected using a Fast Fourier Transform and a known Bark transfer function between the bark frequency domain and the normal frequency domain. At step 2508, the PAP calculates the threshold of hearing. At step 2510, the PAP analyzes the signal converted in step 2506 to the bark frequency domain to locate the tonal peaks therein. Once located, the tonal peaks are removed in step 2512 from the digital converted signal. Next, the digitized signal is divided into critical bands (step 2514) Noise maskers are calculated for each critical band by summing the remaining energy within each critical band (after the tonal peaks have been removed). A representative noise masker is obtained for each critical band from the noise calculated in step 2514. It is understood that, a signal noise masker is substituted therefore at a single frequency and having a predetermined amplitude. The amplitude and frequency of the noise masker are determined by the amount of noise energy within the critical band.

At step 2516 (FIG. 25B), the PAP calculates masking skirts for the tonal and noise maskers based on parameters A–J and based on the amplitudes and frequencies of the tonal and noise maskers. At step 2518, the PAP combines the noise and tonal masking skirts and the threshold of hearing to obtain a global masking threshold for the presently digitized segment of audio=data. The global masking threshold (GMT) is divided into subbands at step 2520. The subbands correspond to the band pass filters 506. At step 2520 the PAP locates the maximum and minimum of each global masking threshold within each subband. At step 2522 the PAP assigns quantization levels for each subband based on amount of noise which may be added to each subband without exceeding the minimum value of the GMT within the corresponding subband. The assignment process is described in more detail below.

Figure 26:
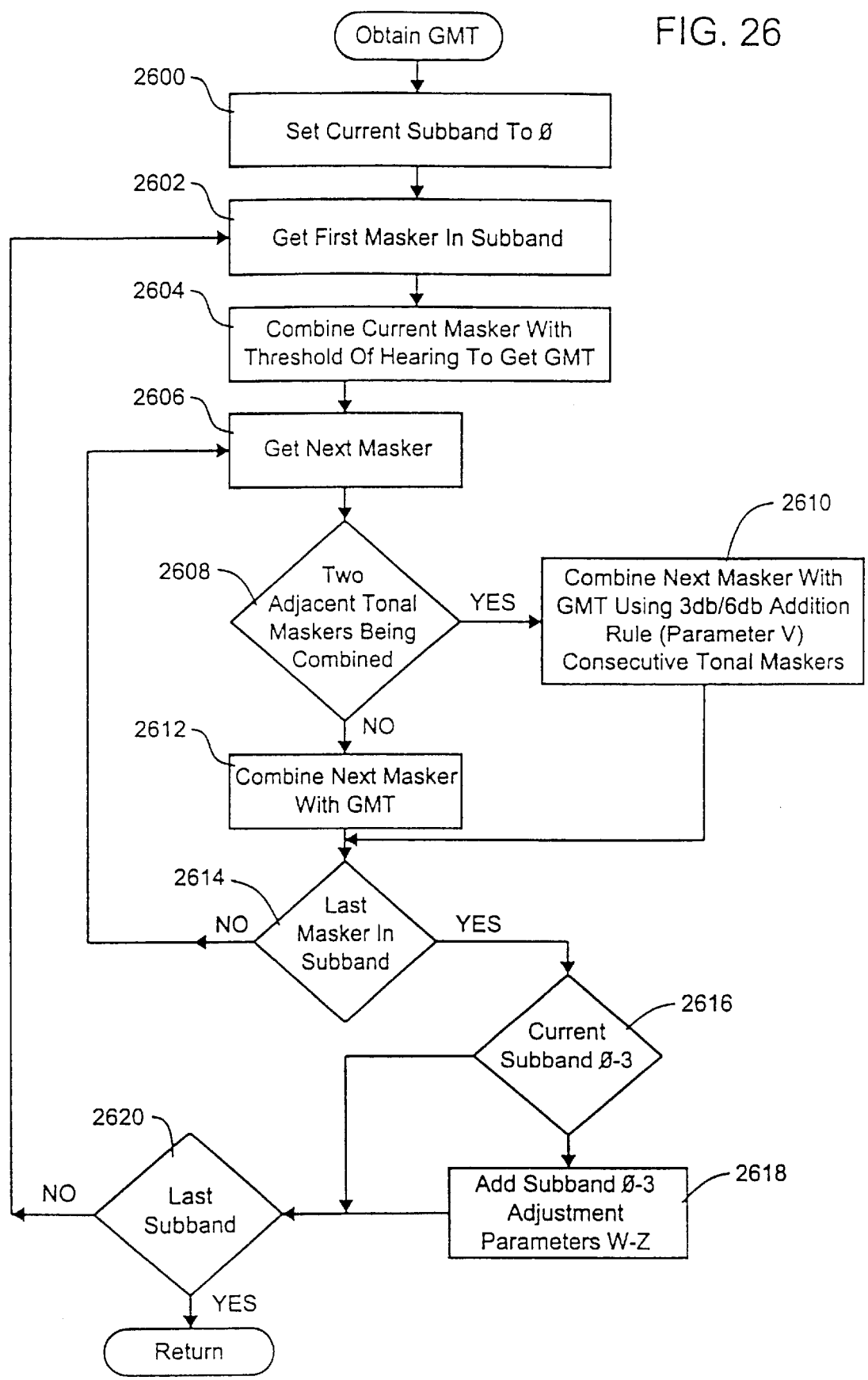
FIG. 26 illustrates a flow diagram of the process followed by the present invention when obtaining a global masking threshold.

Turning to FIG. 26, the process of obtaining the GmT is explained in more detail. At step 2600, the PAP locates the first subband (subband 0) and obtains the first masker within this subband (step 2602). At step 2604, the PAP combines the current masker obtained in step 2602 with the threshold of hearing to obtain an initial GMT for the subband. Thereafter the next masker is obtained at step 2606. The PAP then determines at step 2608 whether the newly obtained and preceding maskers represent adjacent tonal maskers. If two adjacent tonal maskers are being combined, control flows to step 2610 at which the PAP combines the two adjacent total maskers within the GMT using one of two addition rules defined by parameter V. For instance, the two tonal maskers may be combined according to a 3 db or a 6 db addition rule based upon which is chosen by the parameter V. The tonal maskers are combined according to one of the following equations:

$$3 \text{ db(rule)} = 10 \log 12(10P_{1\ (db)}\backslash 10 + 10P2_{2(db)}\backslash 10)$$

$$6 \text{ db(rule)} = 2 \log 12(1P_{1\ (db)}\backslash 2 + 1P_{2\ (db)}\backslash 2)$$

Returning to step 2608 if the two maskers are not tonal maskers, flow moves to step 2612 at which the maskers are combined with the global masking threshold according to the conventional method. Next, at step 2614 it is determined whether the current masker represents the last masker in the subband. If not, steps 2606–2612 are repeated. It the current masker represents the last masker in the subband, flow passes to step 2616 at which the PAP determines whether the current subband is one of subbands 0, 1,2 and 3, if so, control passes to step 2618 at which the global masking threshold for the current subband is adjusted by a biasing level determined by the corresponding one of parameter W–Z. For instance, if the current subband is subband 2, then the GMT within subband 2 is adjusted by a db level determined by parameter Y. At step 2620 it is determined whether the last subband has been analyzed. If not, flow pass to step 2602 where the above described processes repeated. Otherwise, control returns to the main routine illustrated in FIG. 25.

Figure 30:
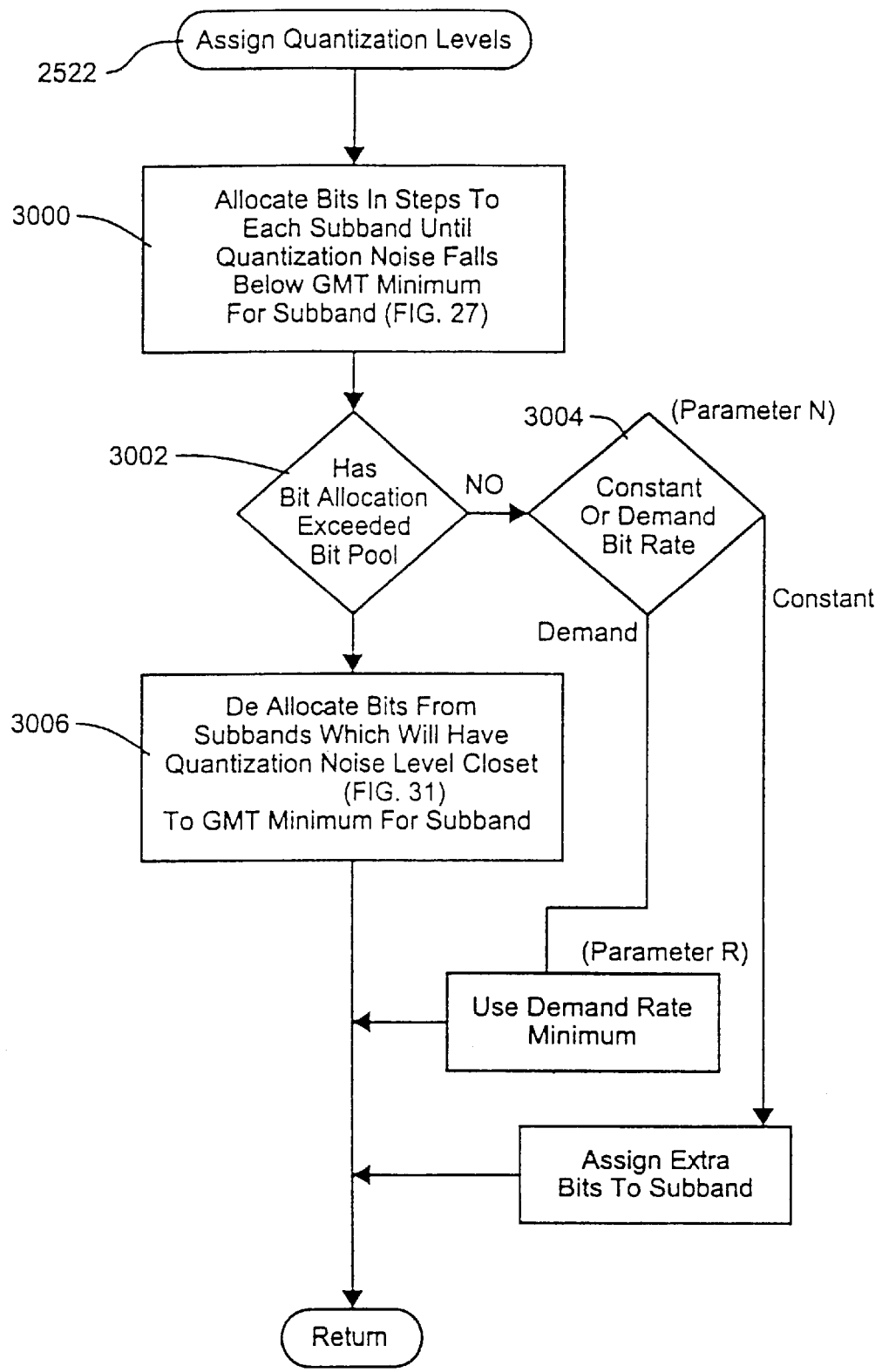
FIG. 30 illustrates a flow diagram of the process followed by the present invention when assigning a quantization level.

Next, the quantization level assignment process of step 2522 is described in more detail in connection with FIG. 30. The assignment process involves three primary phases, namely an allocation phase, a deallocation phase and an excess bit allocation phase. During the allocation phase step (3000), the PAP steps through each subband for each channel (left and right) and assigns the corresponding quantizer a number of bits to be used for quantizing the subband signal. During bit allocation, the number of bits allocated to a subband are incremented in predefined allocation steps until a sufficient number of bits are assigned to the quantizer to ensure that the noise introduced into the signal during the quantizing process is below the minimum of the GMT for the subband. Once the necessary number of bits are assigned to each subband at step 3000 it is determined whether the number of bits allocated has exceeded the number of bits available (i.e., the bit pool) at step 3002. If not, and extra bits exist then control flows to step 3004. At step 3004, the PAP determines whether the encoder is operating in a demand or constant bit rate mode. In a demand mode, once the PAP allocates bits to each subband, the allocations become final, even through the total number of bits needed is less than the number available for the current transmission rate. Thus, the allocation routine ends. However, when in a constant bit rate mode, the extra bits are distributed evenly or unevenly among the subbands.

It is desirable to choose the demand bit rate made when tuning the codec to ensure that the signal heard by the user accurately reflects the parameter values set by the user. The remaining bits from the bit pool are distributed amongst the subbands to further reduce the quantization noise. However, if bit allocation in step 3000 has exceeded the bit pool then flow passes to step 3006 at which bit deallocation is performed and previously assigned bits are removed from selected quantizers which are deemed the best candidate for deallocation. Deallocation occurs with respect to those subbands at which deallocation will have the least negative effect. Put another way, the PAP deallocates bits from subbands which will continue, even after deallocation, to have quantization noise levels closest to the GMT minimum for that subband (even though the quantization noise level exceeds the GMT minimum).

Figure 27:
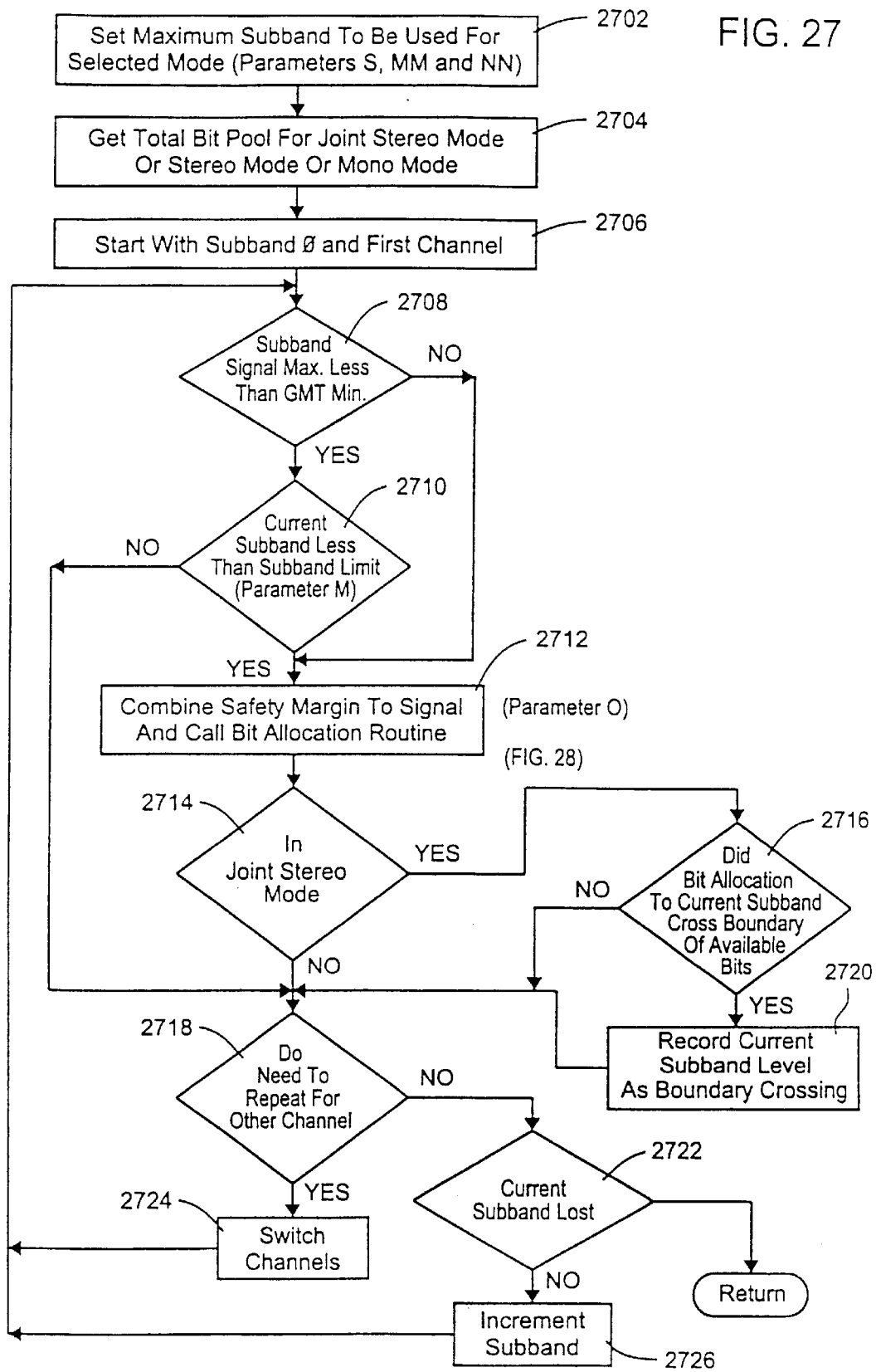
FIG. 27 illustrates a flow diagram of the process followed by the present invention predicting bit allocation for mono, stereo or joint stereo frames.

During bit allocation, flow passes at step 3000 to the routine illustrated in FIG. 27. At step 2702, the PAP determines whether the encoder is operating in a stereo, mono, or joint stereo framing mode. The PAP sets the last subband to be used which is determined by the subband limit parameters S, MN and NN. At step 2704, the PAP determines the total number of bits available (i.e., the bit pool) for the current framing mode, namely for joint stereo, stereo or mono. At step 2706, the first subband and first channel are obtained. At step 2708, the maximum for the signal within the current subband is compared to the GMT minimum within the current subband. If the subband signal maximum is less than the GMT minimum, then the current subband signal need not necessarily be transmitted since it falls below the GMT. Thus, flow passes to step 2710 at which it is determined whether the current subband falls below a subband limit (defined by parameter M). If the current subband is below the subband limit then the PAP allocates bits to the subband even through the subband signal falls below the GMT minimum. For instance, if the current subband is two and the user has designated (via parameter M) that subbands 0–5 should be encoded and transmitted, then subband 2 would be encoded by the corresponding quantizer with a minimum number of bits allocated to the quantizer. Thus, at step 2710, if the current subband is less than the subband limit then control passes to step 2712 at which the bit allocation routine is called to assign at least a first allocation step of a minimum number of bits to the current subband. However, at step 2710 if it is determined that the current subband is greater than the subband limit then control passes to step 2718 and the bit allocation routine is bypassed (i.e. the quantizer for the current subband is not assigned any bits and thus the signal within the current subband is not encoded, nor transmitted). At step 2712, prior to performing the bit allocation routine, the digitized audio signal within the current subband is adjusted to introduce a safety margin or bias thereto to shift the digitized signal upward or downward. This safety margin represents a parameter adjusted dynamically, by the user (parameter O).

After flow returns from the bit allocation routine, it is determined at step 2714 whether the encoder is operating in a joint stereo mode. If not flow passes to step 2718 at which it is determined whether the foregoing process (steps 2708–2714) need to be repeated for the opposite channel. If so, the channels are switched at step 2724 and the process is repeated. If not, flow passes from step 2718 to 2722 at which it is determined whether the current subband is the last subband. If not, the current subband is incremented at step 2726 and the allocation routine is repeated. Thus, steps 2708–2726 are repeated each subband.

Returning to step 2714, when operating in a joint stereo mode, control passes to step 2716 at which it is determined whether the bit allocation routine at step 2712 allocated a number of bits to the current subband which resulted in the total number of allocated bits exceeding the available bit pool for the current mode. If so, the current subband number is recorded at step 2720 as the subband at which the bit pool boundary was exceeded.

When in a stereo mode the process flows from step 2708 to step 2726 without using steps 2716 and 2720 in order that every subband within the right and left channels is assigned the necessary number of bits to insure that the quantization noise falls below global masking threshold within the corresponding subband. When in the joint stereo mode, the foregoing process is repeated separately for every subband within the left and right channels (just as in the stereo mode). However, the system records the subband number at which the available bit pool was exceeded in step 2720. This subband number is later used to determine a joint stereo boundary such that all subbands below the boundary are processed separately in stereo for the left and right channels. All subbands above the boundary are processed jointly, such as shown by the joint stereo encoder of FIG. 23. The subband boundary corresponds to the break point between the low pass filter banks 608 and 612 and the high pass filter banks 610 and 614 (shown in FIG. 23).

Figure 28:
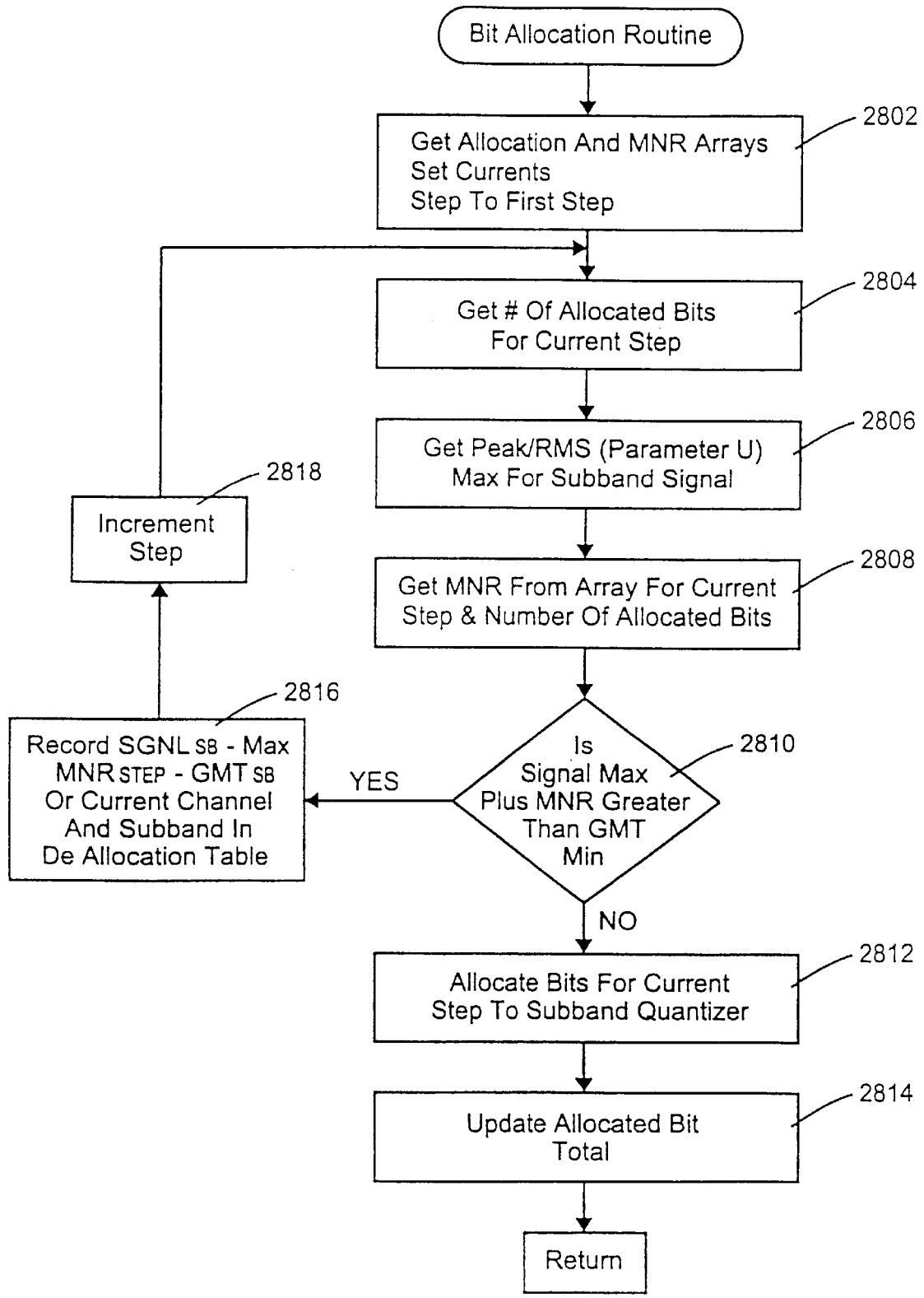
FIG. 28 illustrates a flow diagram of the process followed by the present invention when determining an allocation step for a specific subband.
Figure 29:
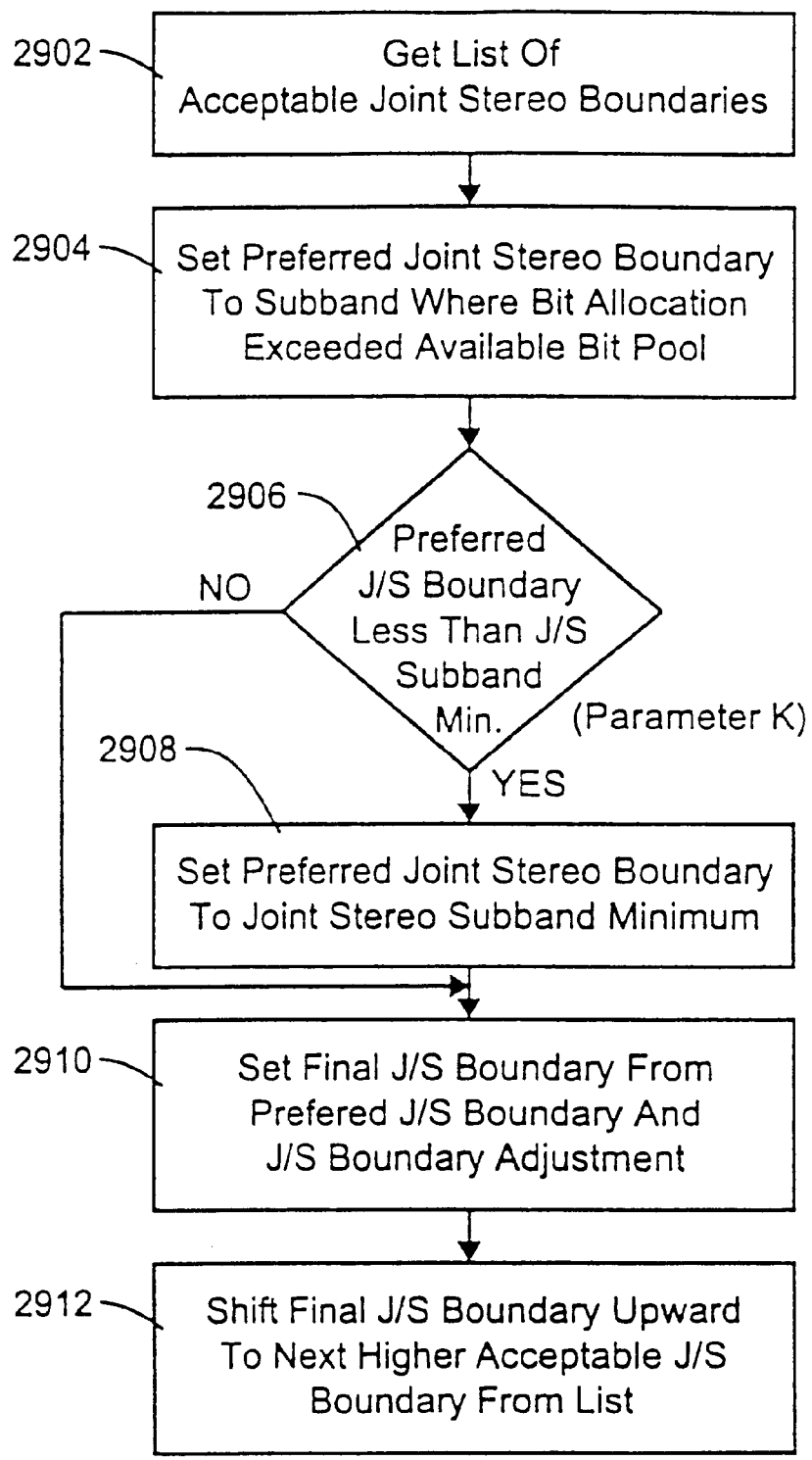
FIG. 29 illustrates a flow diagram of the process followed by the present invention when determining the joint stereo boundary.

Turning to FIG. 28, the bit allocation routine is described in more detail. Beginning at step 2802, an array of allocation steps is obtained for the current mode (e.g., stereo, mono or joint stereo. Each level within the array corresponds to a predefined number of bits to be assigned to a quantizer. By way of example, the array may include 17 elements, with elements 1, 2 and 3 equaling 60 bits, 84 bits and 124 bits, respectively. Thus at the first step 60 bits are assigned to the quantizer corresponding to the current subband. At the second step, 84 bits are assigned to the quantizer corresponding to the current subband. Similarly, at the third step, 124 bits are assigned to the quantizer for the current subband. The steps are incremented until the current step allocates a sufficient number of bits to the quantizer to reduce the quantization noise below the minimum GMT for the current subband. In addition to the bit allocation array, a mask to noise ratio array is included containing a list of elements, each of which corresponds to a unique step. Each element contains a predefined mask to noise ratio identifying the amount of noise introduced into the encoded signal when a given number of bits are utilized to quantize the subband.

For instance, steps 1, 2 and 3 may correspond to mask to noise ratios (MNR) of 10 db, 8 db and 6 db, respectively. Thus, if 60-bits are allocated to the current quantizer for quantizing the current subband, 10 db of noise will be introduced into the resultant encoded signals. Similarly, if 84 bits are used to quantize the signal within the current subband, 8 db of noise are introduced.

At step 2802, the allocation and MNR arrays are obtained and the current step is set to 1. At step 2804, the allocation array is accessed to obtain the number of bits to be allocated to the current subband for the current step. At step 2806 the maximum level of the audio signal within the current subband is obtained based on one of the audio peak or RMS value, which one selected between determined by parameter U. Next, the MNR value for the current step is obtained from the MNR array (2808). At step 2810, it is determined whether the audio signal maximum, when combined with the MNR value of the current allocation step, exceed the minimum of the GMT for the current subband. If so, then a detectable amount of noise will be introduced into the signal if the current allocation step is used. Thus, control passes to step 2816.

At step 2816, the PAP records the difference between the GMT minimum of the current subband and the level combined signal formed from the maximum value for the audio signal and the MNR. Thereafter, at 2818 the allocation step is incremented in order to allocation more bits to the current subband. The foregoing loop is repeated until the allocation step is incremented sufficiently to allocate a number of bits to the current subband necessary to reduce the combined signal formed from the audio signal max and MNR below the minimum of the GMT. Once it is determined at step 2810 that this combined signal is less than the minimum of the GMT, control passes to step 2812. At step 2812, the number of bits corresponding to the current step are allocated to the quantizer for the current subband. At step 2814, the system updates the total number of allocated bits for the current segment of audio information.

According to foregoing process, each quantizer is assigned a number of bits corresponding to an allocation step which is just sufficient to reduce the combined noise and audio signal below the minimum of the GMT. In addition, at step 2816, the system retains a deallocation table having one element for each subband and channel. Each element within the table corresponds to the difference between the GMT minimum and the combined audio signal maximum and MNR value for the allocation step preceding the allocation step ultimately assigned to the quantizer in step 2812.

By way of example, a quantizer may be assigned the number of bits corresponding to allocation step 3 (e.g., 124 bits). At step 2816, it was determined that the signal and MNR for step 2 exceeded the GMT minimum by 3 db. The deallocation table will record at step 2816 this 3 db value indicating that, while the current quantizer is assigned to allocation step 3, if the current quantizer had been assigned to allocation step #2. The combined signal and MNR would exceed the GMT minimum by 3 db. The deallocation table recorded at step 2816 may be used later if the deallocation of bits becomes necessary (as explained below).

The bit allocation routine of FIG. 28 is continuously repeated for each channel and for each subband (according to the process of FIG. 27). Once control returns to step 3000 in FIG. 30, all of the subbands for both channels have been allocated the necessary number of bits. At step 3002 if it is determined that the number of bits allocated exceeds the bit pool, control passes to step 3006 which is illustrated in more detail in FIG. 31.

Figure 31:
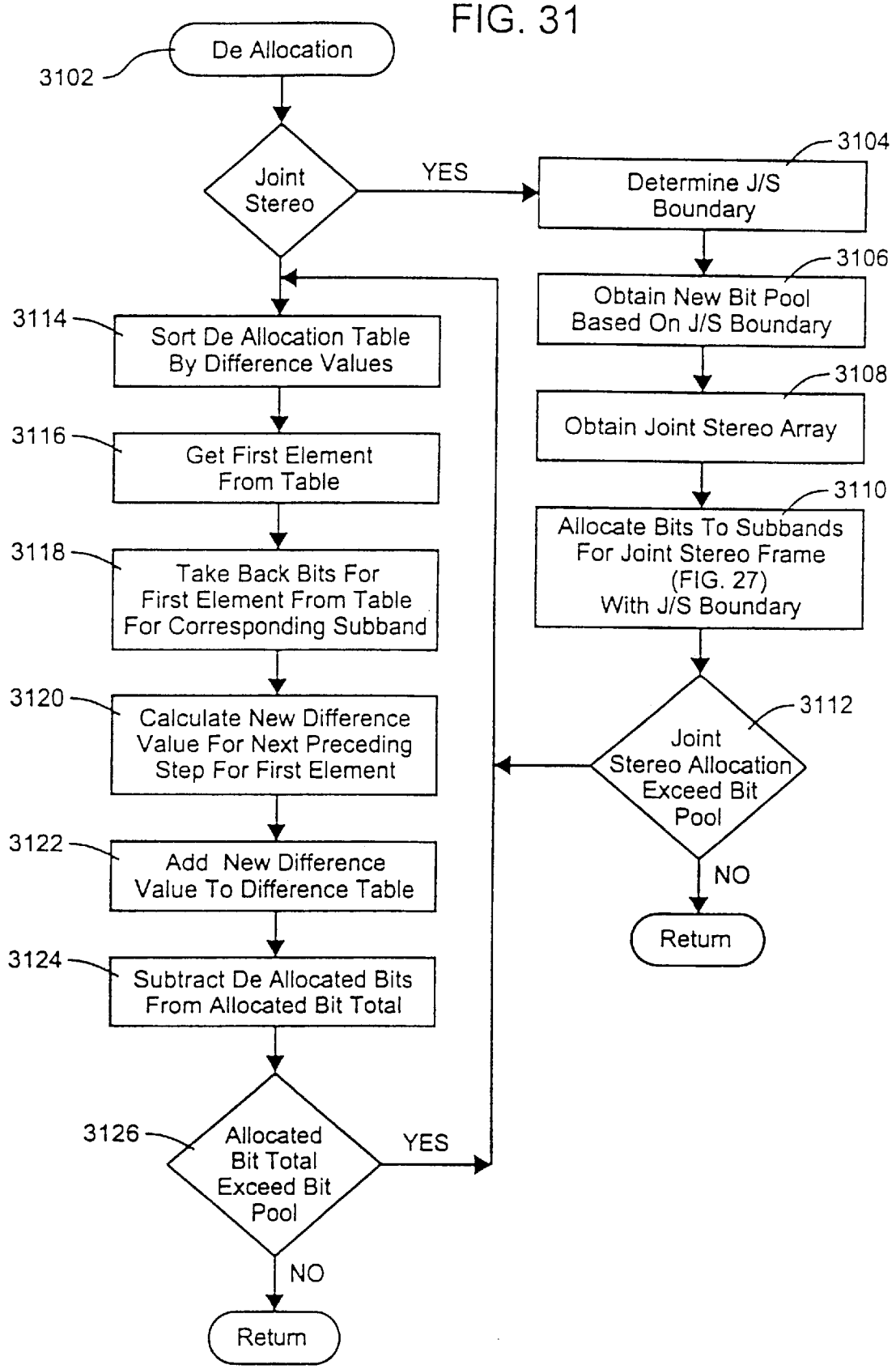
FIG. 31 illustrates a flow diagram of the process followed by the present invention when deallocating bits from one or more subbands following the initial allocation process.

When it is determined that deallocation is necessary, control passes from step 3006 (FIG. 30) to the deallocation routine illustrated in FIG. 31. At step 3102, it is determined whether the encoder is operating in a joint stereo mode. If so, control passes to step 3104 at which the joint stereo boundary is determined. The joint stereo boundary represents the boundary between the low pass filter banks 608 and 612 and high pass filter banks 610 and 614 (FIG. 23). Subbands below the joint stereo boundary are processed separately for the left and right channels within the low pass filter banks 608 and 612. Subbands above the joint stereo boundary are included within the high pass filter banks 610 and 614 and are combined in summer 632 to form a mono signal. Thus, subbands above the joint stereo boundary are combined for the left and right channels and passed through a single quantizer bank 636.

Returning to FIG. 31, once the joint stereo boundary is determined, a new bit pool is obtained based on the joint stereo boundary (step 3106). A new bit pool must be calculated since the original bit pool which calculated based on full stereo whereby it was presumed that bits would be allocated to all of the subbands separately for the left and right channels. However, subbands above the boundary are combined for the left and right channels and thus additional bits are available for allocation. For instance, in a full stereo system using 22 subbands per channel, bits must be allocated between 44 separate subbands (i.e., 22 subbands for the left channel and 22 subbands for the right channel). However, in a joint stereo mode utilizing 22 subbands with the joint stereo boundary at subband 8, only 32 subbands are necessary (i.e., eight lower subbands for the left channel, eight lower subbands for the right channel and 16 upper subbands for the combined signals from the left and right signals). Once the new bit pool is calculated, the joint stereo array is obtained at step 3108. The joint stereo array identifies the allocation steps combining the number of bits to be allocated for each step during the bit allocation routine (FIG. 28). In addition, the joint stereo array identifies the mask to noise ratio for each allocation step. At step 3110, the bit allocation routine (FIG. 28) is called to allocate bits to the subbands, wherein subbands below the joint stereo boundary are separately allocated for the left and right channels, while subbands above the joint stereo boundary are allocated for a single set of band pass filters representing the combination of the signals from the left and right channels.

Next, at step 3112, it is determined whether the bit allocation for the joint stereo frame exceeds the joint stereo bit pool (obtained at step 3106). If not, control returns to the routine in FIG. 30. However, if more bits have been allocated than are available in the bit pool, control passes to step 3114 to begin a deallocation process. At step 3114, the deallocation table (generated at step 2816 in FIG. 28) is sorted based on the difference values recorded therein to align these difference values in descending order. At step 3116, the first element within the deallocation table is obtained. At step 3118, a deallocation operation is effected. To deallocate bits, the quantizer corresponding to the channel and subband identified in the first element of the deallocation table is assigned a new number of quantizing bits. The number of bits newly assigned to this quantizer corresponds to the step preceding the step original assigned to the quantizer. For instance, if during the original allocation routine, a quantizer was assigned 124 bits (corresponding to step 3), then at step 3118, the quantizer would be assigned 84 bits (corresponding to allocation step 2).

At step 3120, a new difference value is calculated for the current subband based on the allocation step preceding the newly assigned allocation step. This new difference is added to the difference table at step 3122. The number of deallocated are then subtracted from the allocated bit total (step 3124). Thereafter, it is determined whether the new total of bits allocated still exceeds the available bit pool (step 3126). If not, control returns to step 3006 (FIG. 30). If the allocation bit total still exceeds the bit pool, control returns to step 3114 and the above described deallocation processes is repeated.

Figures 32A, 32B, 33:
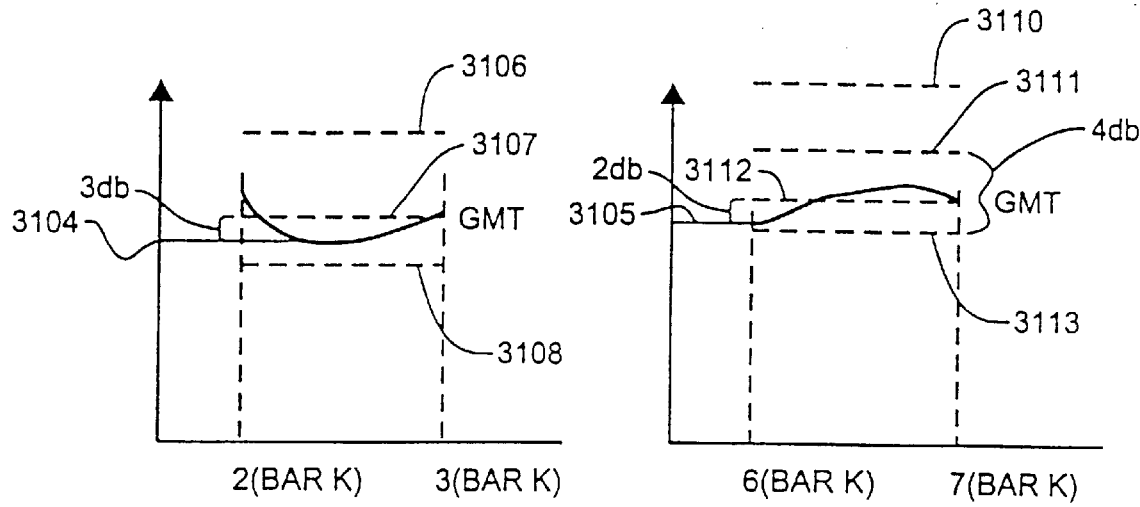
FIGS. 32a and 32b illustrate graphs of exemplary subbands having a portion of the global masking threshold therein and multiple masking-to-noise ratios therein corresponding to multiple allocation steps.
FIG. 33 illustrates a deallocation table recorded during bit allocation and deallocation.

FIGS. 32 and 33 set forth an example explained hereafter in connection with the allocation steps and deallocation routine. FIGS. 32A and 32B illustrate two exemplary subbands with the corresponding portions of the global masking threshold and the quantized signal levels derived from the audio signal peak and MNR value. The quantized signal levels are denoted at points 31063108 and 3110–3113. The minimums of the GMT are denoted at levels 3204 and 3205. Stated another way, if the number of bits associated with allocation step #1 are assigned to the quantizer for subband 3 (FIG. 32A), the resultant combined audio signal and MNR will have a magnitude proximate line 3206. If more bits are assigned to the quantizer (i.e., allocation step 2), the combined signal and MNR value is reduced to the level denoted at line 3207. Similarly, at allocation step #3, if additional bits are allocated to the quantizer the combined audio signal and MNR value will lie proximate line 3208.

With reference to FIG. 32B, at allocation step #1 the combined audio and MNR level will lie proximate line 3210. At step #2, the it will be reduced to level 3211, and at allocation step #3, will fall to line 3212. At allocation step 4, sufficient bits will be allocated to the quantizer to reduce the combined signal and MNR value to level 3213 which falls below the GMT min at point 3205.

The bit allocation routine as discussed above, progresses through the allocation steps until the combined signal and MNR value (hereafter the quantizing valve) falls below the minimum of the GMT. During each innervation through the bit allocation routine, when the quantizing value is greater than the GMT min, the deallocation table is updated to include the difference value between the minimum of the GMT and the MNR value. Thus, the deallocation table of FIG. 32 stores the channel and subband for each difference value. In the present example, the deallocation table records for subband 3 (FIG. 32A) the difference value 3 db which represents the distance between the minimum of the GMT at point 3204 and the quantization level at point 3207 above the GMT. The table also stores the allocation step associated with the quantization value at line 3207. The deallocation table also stores an element for subband 7 which represents the difference value between the minimum of the GMT and the quantization level corresponding to line 3212.

During the deallocation routine, the deallocation table is resorted to place with the difference values in ascending order, such that the first element in the table corresponds to the subband with the least difference value between the minimum GMT and quantization level of the next closest MNR value. The quantizer corresponding to subband 7 deallocated, such that the number of bits assign thereto is reduced from the number of bits corresponding to step #4 (line 3213) to the number of bits corresponding to step #3 (line 3212). Thus, the deallocation routine subtracts bits from the subband which will introduce the least amount of noise above the GMT for that subband. Once the subband 7 has been deallocated, the difference value is recalculated for the next preceding step (corresponding to MNR at line 3211). This new difference value is stored in the deallocation table along with its corresponding allocation step. If the number of bits deallocated during the first pass through this process is insufficient to lower the total allocated bits below the available bit pool maximum, than the processes repeated. In a second innervation, the quantizer corresponding to subband 3 would be reallocated with fewer bits corresponding to allocation step #2 (line 3207). This process is repeated until the total allocated bits falls within the available bit pool.

Basic Components and CODEC System

Figure 1:
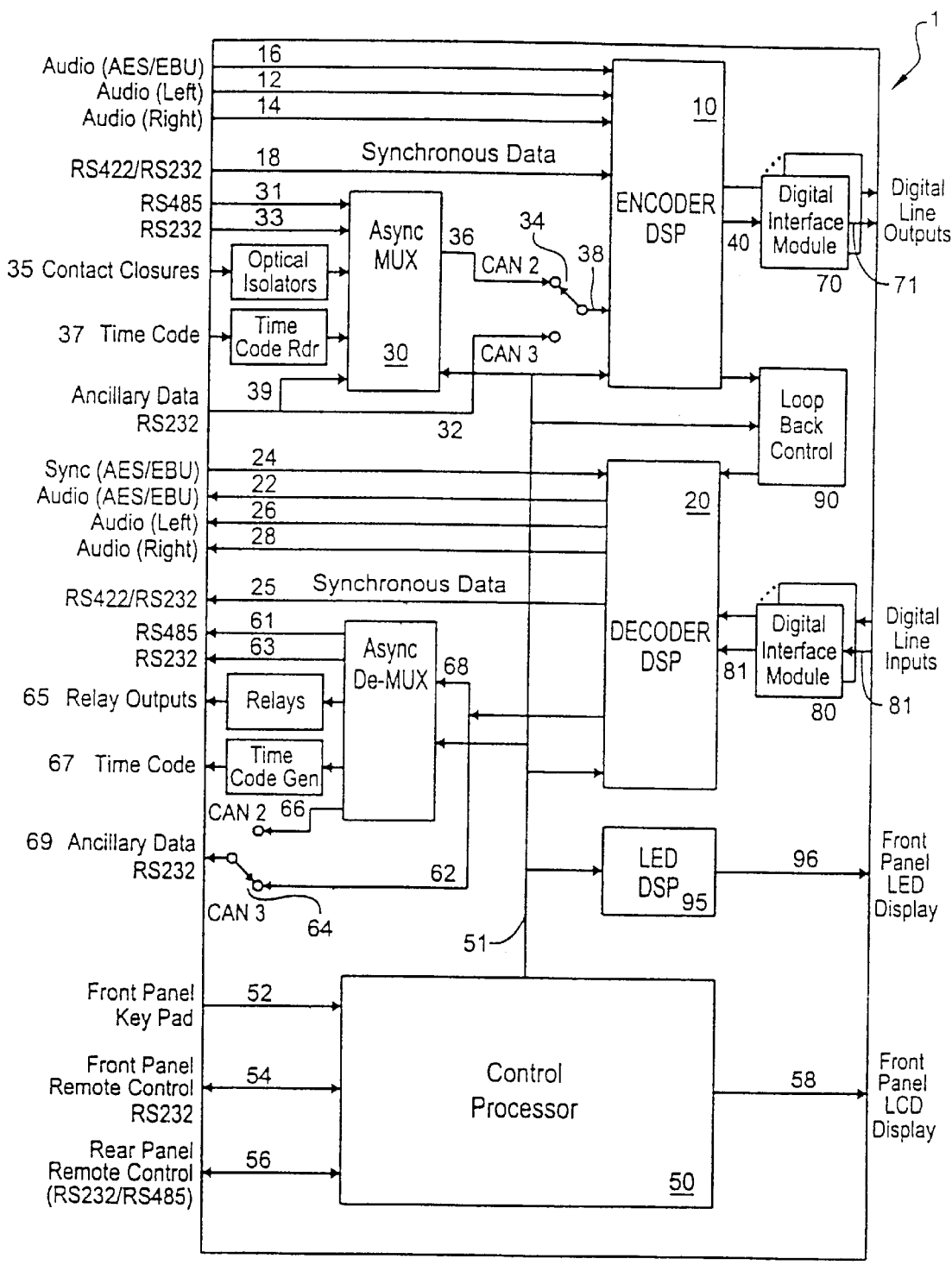
FIG. 1 is a block diagram of a CODEC illustrating signal connections between various components in accordance with a preferred embodiment of the present invention.

FIG. 1 illustrates a high level block diagram of a CODEC 1. FIG. 1 shows an encoder digital signal processor (DSP) 1, a decoder DSP 2, an LED DSP 95, an asynchronous multiplexer 3, an asynchronous demultiplexer 6, at least one digital interface module (DIM) 7 connected to the encoder output, at least one DIM 8 connected to the decoder input, a loopback control module 9, and a control processor 5. The encoder 1 inputs digital signals and timing signals and outputs compressed audio bit streams. The decoder 2 similarly inputs compressed audio bit streams and timing signals and outputs decompressed digital signals.

The CODEC 1 is capable of holding several audio compression algorithms (e.g. ISO MPEG and G.722). These and other algorithms might be downloaded into the CODEC from ISDN and thus future upgrades are simple and effortless to install. This creates an extremely versatile CODEC that is resistant to obsolescence. This should be contrasted to the ROM type of upgrade procedure currently employed by most CODEC manufacturers.

The CODEC 1 may also use a unique compression technique which is explained below and is described in the attached Software Appendix. This compression technique also uses an increased number of psycho-acoustic parameters to facilitate even more efficient compression and decompression of audio bit streams. These additional parameters are described above.

Figure 6:
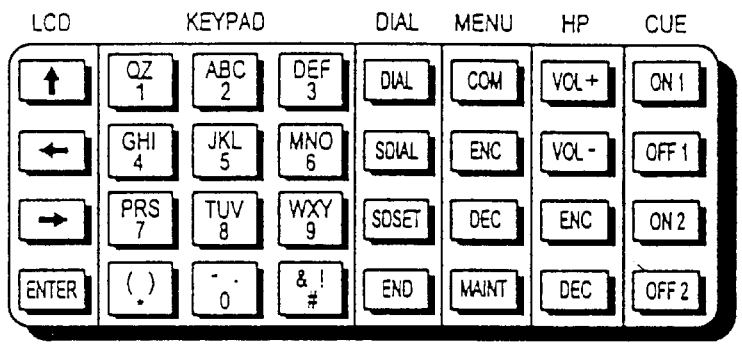
FIG. 6 is another example of a front panel user keypad layout in accordance with a preferred embodiment of the present invention.
Figure 7:
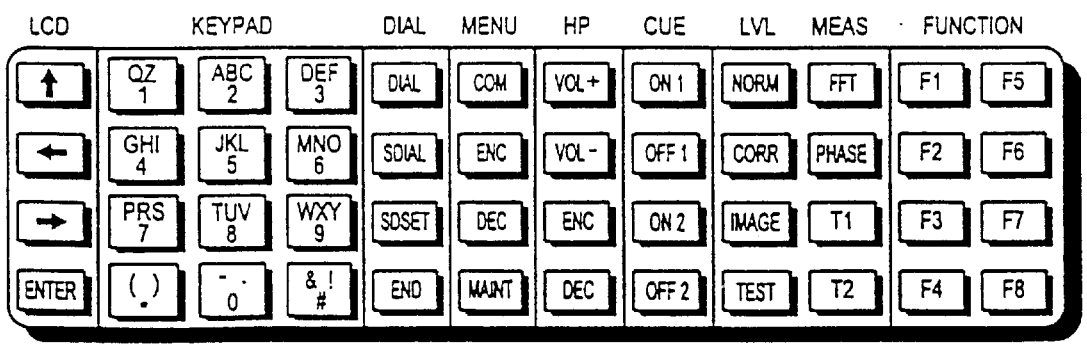
FIG. 7 is another example of a front panel user keypad layout in accordance with a preferred embodiment of the present invention.

The CODEC 1 also contains a control processor 5 for receiving and processing control commands. These commands are conveyed to the various CODEC 1 components by a line 51. These commands might be entered by a user via front panel key pads such as 15, 152, and 154, as shown in FIGS. 5, 6, and 7. Keypad commands enter processor 5 through a line 52. The keypad also allows the user to navigate through a menu tree of command choices which fall into the general categories of common commands, encoder commands, decoder commands, and maintenance commands. Such menu choices are displayed on a Front Panel LCD display (not shown) via signals from a processor 5 on a line 58. (See LCD Menu Summary of commands, Chap 8 of CODEC manual, attached to the end of this specification before the claims). The LCD display might also be used for characters to show responses to front panel user commands as well as spontaneous messages such as incoming call connect directives. Additionally, the LCD display may be used to display graphical information.

The CODEC processor 5 may receive commands from a front panel remote control panel (RS232 interface format) and enter the processor 5 through the line 54. A front panel remote control allows computer access to all internal functions of the CODEC 1. Front panel remote control is especially useful for applications that need quick access via a palm top or lap top computer. This frequently occurs in control rooms where there are many CODECs in equipment racks serving different functions. A full complement of remote control commands exists to facilitate control of the CODEC 1 (See the listing of remote control commands from the "cdqPRIMA" operating manual, Chapter 9, attached to the end of specification).

Referring again to FIG. 2, this more detailed block diagram of CODEC 1 shows external front panel remote control data interacting with Front Panel Remote Control UART 178 via a line 54. UART 178 is controlled by the Control Micro 5 via a control network line 155.

The CODEC 1 also provides a rear panel remote control port which uses either RS232 or RS485 interface formats. The RS485 port may be either a 2 or 4 wire interface. A rear panel remote control also allows computer access to all the internal functions of the CODEC 1. Rear panel remote control is especially useful for applications which need permanent access to the CODEC 1 via computer control. This frequently occurs when the CODEC 1 is remotely located from the control room. The electrical interface choice is controlled by a command entered through remote control or a keypad.

Referring again to FIG. 2, this more detailed block diagram of the CODEC 1 shows external rear panel remote control data interacting with Remote Control UART 18 via line 56. UART 18 is controlled by Control Micro 5 via the control network line 155.

Figure 11:
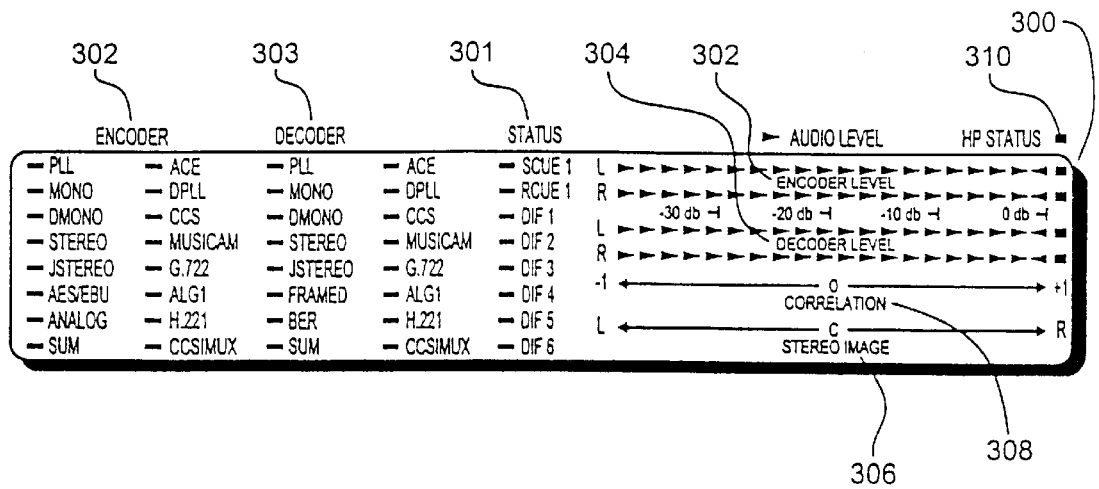
FIG. 11 is an example of an LED front panel display in accordance with a preferred embodiment of the present invention.
Figure 12:
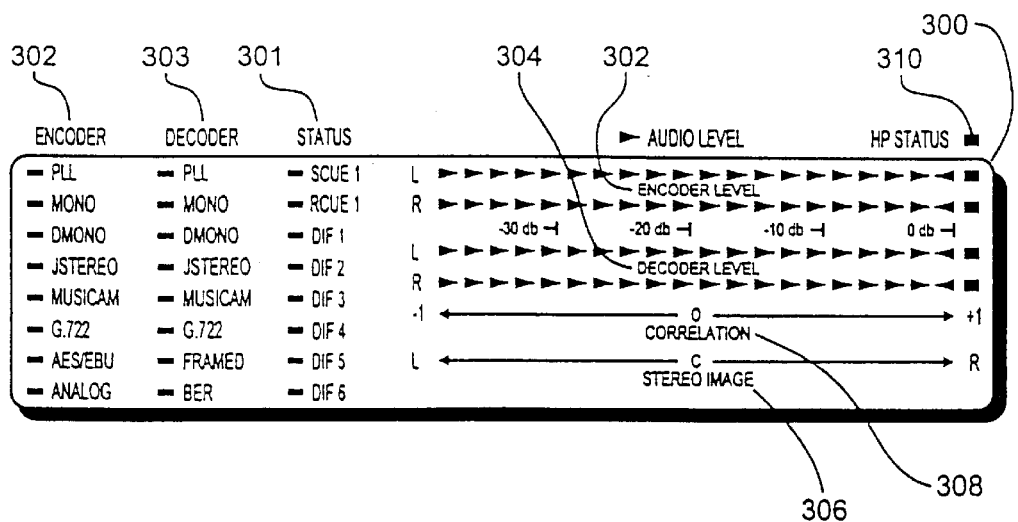
FIG. 12 is another example of an LED front panel display in accordance with a preferred embodiment of the present invention.

The CODEC also includes a Front Panel LED display 3, examples of which are shown in FIGS. 11 and 12. This includes a set of Status, Encoder, and Decoder LED's to show the status of various CODEC functions, for instance which compression algorithm is being used, and/or whether error conditions exist. The Status 31, Encoder 32, and Decoder 33 groups of LED's might be independently dimmed to allow emphasis of a particular group.

Referring again to FIG. 1, signals from control processor 5 enter LED DSP 95 through the line 51. These control signals are processed by a LED DSP 95 and drive a LED display 3 (FIGS. 11 and 12) via a line 96.

A LED display 3 also shows peak and average level indications for the encoder 32 (left and right channels) and the decoder 34 (left and right channels). Each LED represents −2 dB of signal level and the maximum level is labeled dB. This maximum level is the highest level permissible at the input or at the output of the CODEC. All levels are measured relative to this maximum level. The level LED's display a 4 dB audio range. A peak hold feature of the level LED's shows the highest level of any audio sample. This value is instantly registered and the single peak level LED moves to the value representing this signal. If the peak level of all future signals are smaller, then the peak LED slowly decays to the new peak level. The peak level LED utilizes a fast attack and slow decay operation. The LED display 3 also includes a level display to show stereo image 36 which is used to display the position of the stereo image. This is useful when setting the levels of the left and right channels to insure the proper balance. Also included is a correlation level display 38 which is used to check if the left and right channels are correlated. If the left and right channels are correlated, then they might be mixed to mono. The level LED's might also be used to display a scrolling message.

Referring again to FIG. 2, this more detailed block diagram of CODEC 1 shows the LED DSP 95 driving a LED Array 125 via a connection 96. As also shown, the LED DSP 95 is controlled by the Control Micro 5 via the control network line 155. The DSP 95 also drives an Headphone (Hp) D/A Converter 98 via a connection 97. A converter 98 then outputs this analog signal via a connector 99 to external headphones (not shown). The headphones allow the user to monitor both the input and output signals of the CODEC 1. FIGS. 11 and 12 show headphone indicators 31 at the far right of the level displays to denote the signal output to the headphones. If both LED's are illuminated, then the left audio channel is output to the left earphone and the right audio channel is output to the right earphone. If only the left LED is illuminated, the left audio channel is output to both the left and right headphone. Similarly, if only the right LED is illuminated, the right audio channel is output to both the left and right headphone.

Analog Inputs and Outputs

Figure 2:
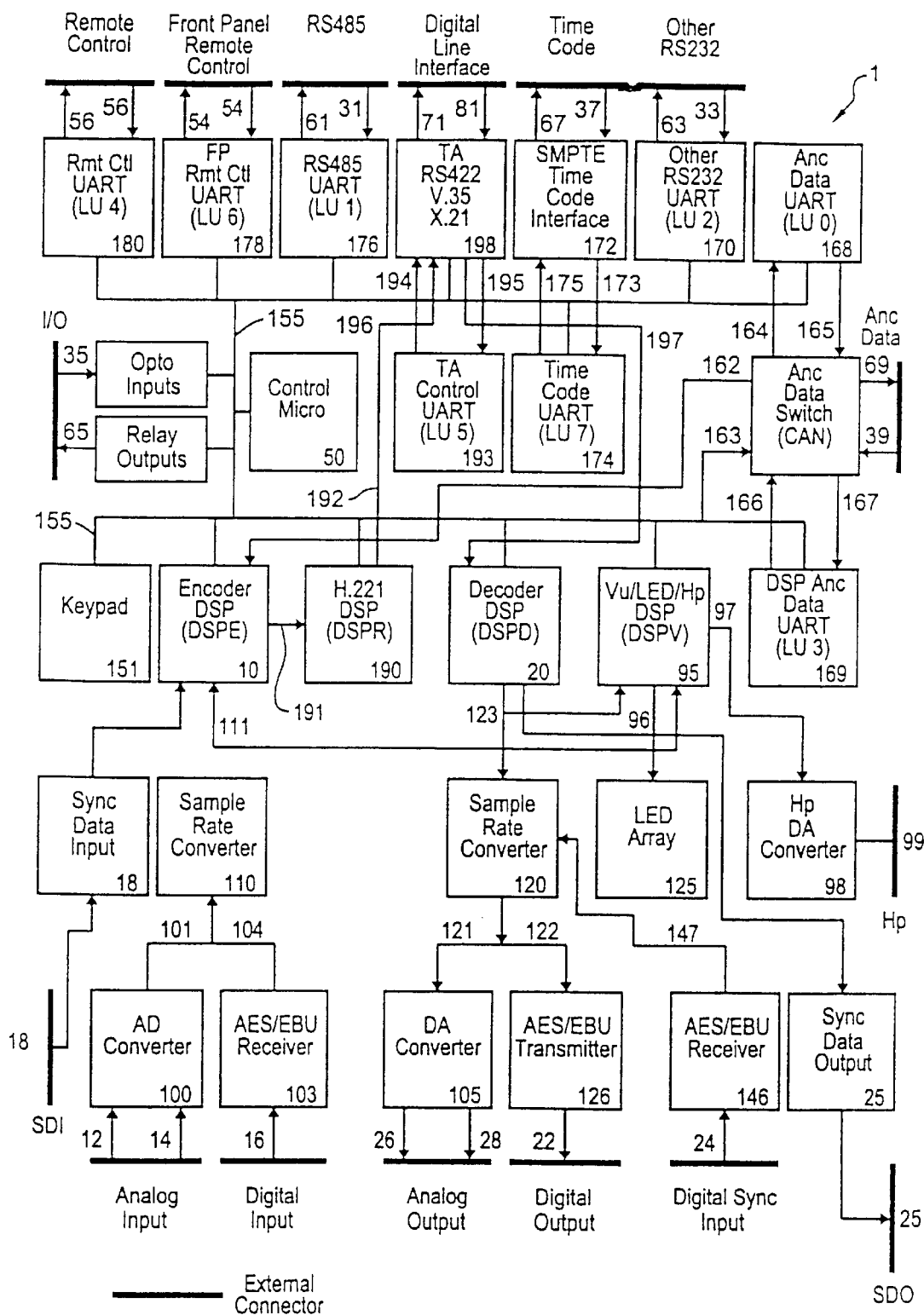
FIG. 2 is a block diagram of a CODEC illustrating signal connections between various components in accordance with the preferred embodiment shown in FIG. 1.

FIG. 2 shows a more detailed block diagram of the CODEC 1 structure. Referring to FIGS. 1 and 2, the left audio signal 12 and the right audio signal 14 are external analog inputs which are fed into an Analog to Digital (A/D) Converter 1, and converted into digital signals on a line 11. Similarly digital audio output signals on a line 121 are converted from Digital to Analog (D/A) via a converter 15. The converters 1 and 15 use an 18 bit format. The analog sections of the CODEC are set to +18 dBu maximum input levels, other analog input and output levels might used.

Direct Digital Inputs and Outputs

Referring again to FIG. 1, the CODEC 1 also allows for direct input of digital audio information via an AES/EBU digital audio interface on line 16 into encoder 1. The decoder 2 similarly outputs decoded, decompressed digital audio information on AES/EBU output line 22. These interfaces allow for interconnection of equipment without the need for A/D conversions. It is always desirable to reduce the number of A/D conversions since each time this conversion is performed, noise is generated. These interfaces might use a DB9 or XLR connectors.

AES/EBU digital input and output rates might vary and therefore such rates are converted, or adapted, by a Sample Rate Converter 11, to eliminate any digital clock problems. The A/D Converter 1 signals are similarly converted, or adapted, by a Sample Rate Convertor 11 before entering the encoder 1. Because of the rate adapters, the input/output digital rates are not required to be the same as the internal rates. For example, it is possible to input 44.1 kHz AES/EBU digital audio input and ask the CODEC 1 to perform compression at 48, 44.1 or 32 kHz (by using the front panel LCD display or a remote control command). This is possible because of the digital rate adapters similarly, digital audio input sources might be 32, 44.1, or 48 kHz. These input sampling rates are automatically sensed and rate adapted. The compression technique at the encoder determines the internal digital sampling rate at the decoder, and a control command is used to set this rate. The AES/EBU digital output sampling rate from the decoder is also set via a control command and might be a variety of values.

The digital audio is output from the decoder at the sampling rate specified in the header. This rate might then be converted to other rates via the Sample Rate Convertor 12. The Sample Rate Convertors 11, 12 are capable of sampling rate changes between 0.51 and 1.99. For example, if the receiver received a bit stream that indicated that the sampling rate was 24 kHz, then the output sampling rate could be set to 32 or 44 kHz but not 48 kHz since 48 kHz would be a sampling rate conversion of 2 to 1. This is out of the range of the sampling rate converter. The allowed output sampling rates include 29.5, 32, 44.1, and 48 kHz. Other direct digital I/O formats might include, for example, SPDIF or Optical.

The encoder 1 receives direct digital input via a connector on the rear panel (line 16) Analog or digital signals (but not both simultaneously) may be input into the CODEC 1 as selected by a front panel switch. If the digital input is selected, the CODEC 1 locks to the incoming AES/EBU input and displays the lock condition via a front panel LED. If digital audio input is selected, an AES phase-lock loop (PLL) is used to lock onto the signal. Accordingly, the AES PLL lock light must be illuminated before audio is accepted for encoding. In normal operation, the CODEC 1 locks its internal clocks to the clock of the telephone network. For loopback (discussed below), the CODEC 1 locks its clocks to an internal clock. In either case, the clock used by the CODEC 1 is not precisely the same frequency as the AES/EBU input. To prevent slips from occurring due to the presence of two master clocks, a rate synchronizer is built into the encoder section to perform the necessary rate conversion between the two clocks.

Figure 8:
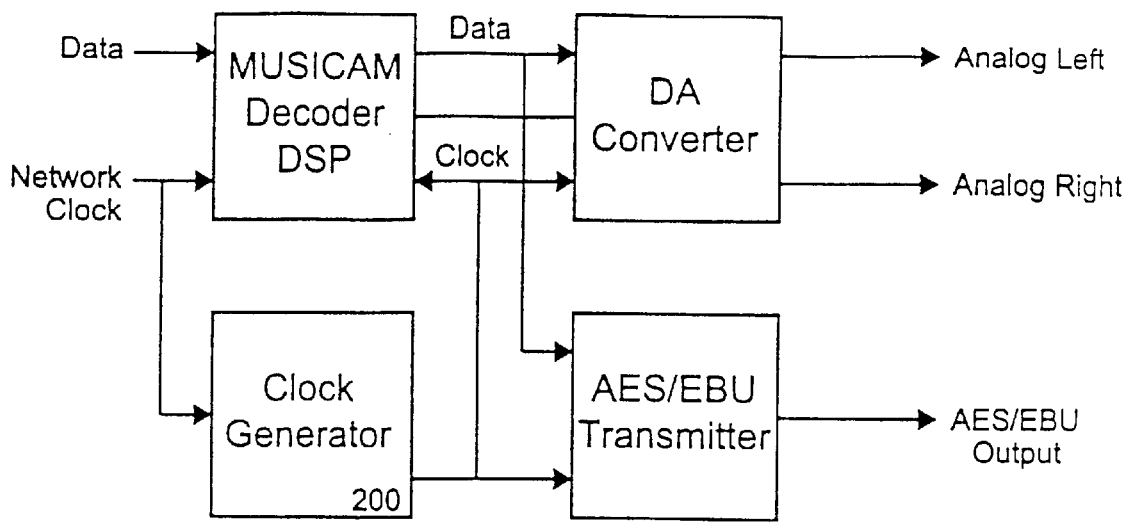
FIG. 8 is a block diagram showing the decoder output timing with the AES/EBU sync disabled or not present and using normal timing in accordance with a preferred embodiment of the present invention.
Figure 9:
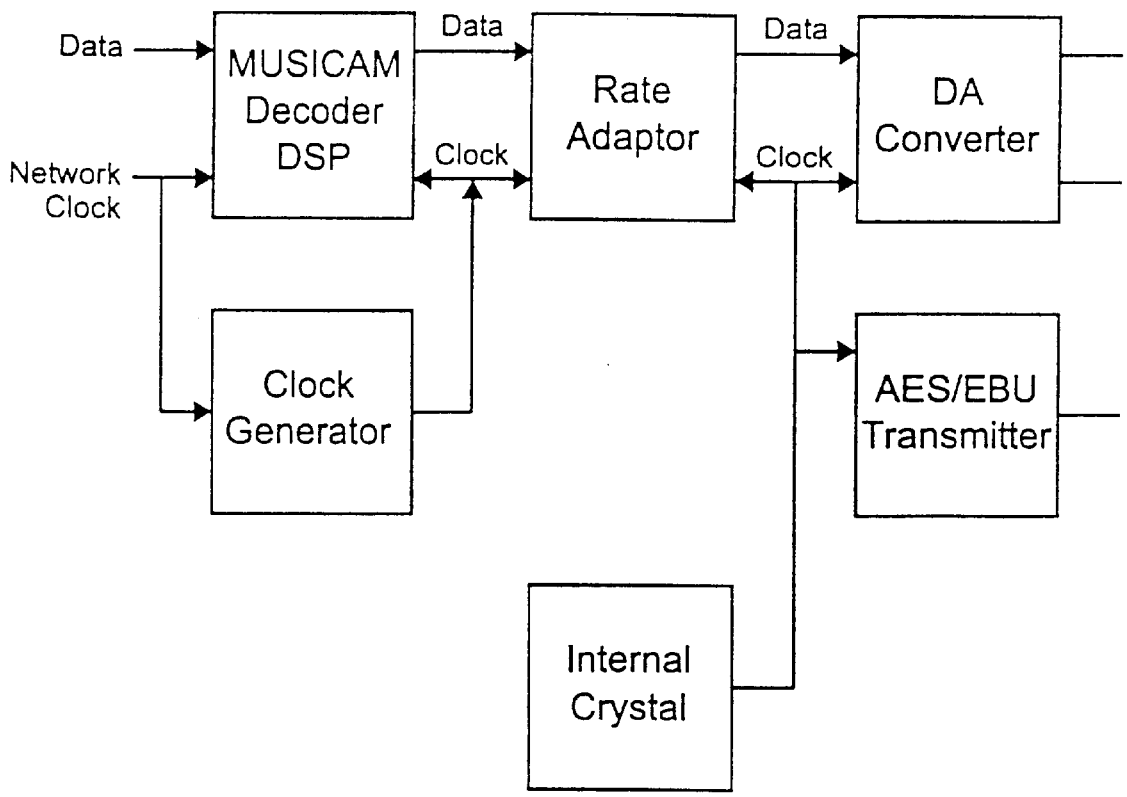
FIG. 9 is a block diagram showing the decoder output timing with AES/EBU sync disabled or not present using internal crystal timing in accordance with a preferred embodiment of the present invention.
Figure 10:
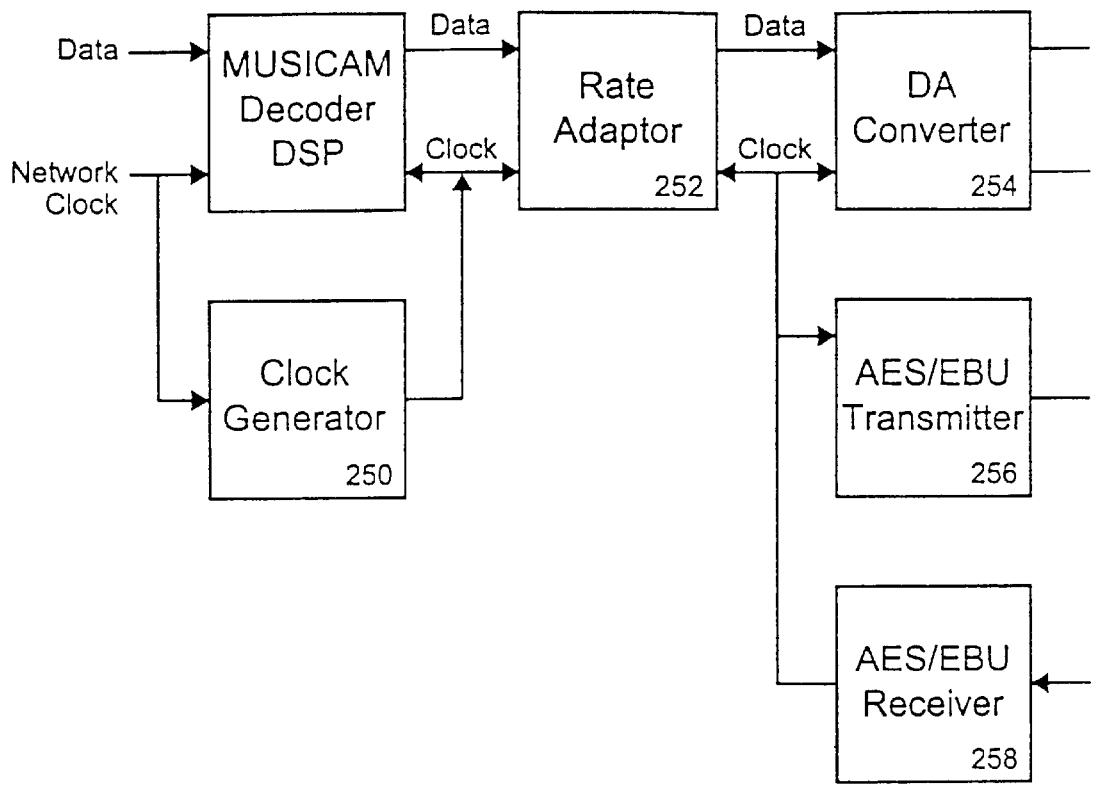
FIG. 10 is a block diagram showing decoder output timing with AES/EBU sync enabled and present using AES timing in accordance with a preferred embodiment of the present invention.

The decoder 2 outputs direct digital signals via a rear panel connector (line 22). Additionally, the decoder may be synchronized to an external clock by an additional connector (SYNC. line 24) on the rear panel. Referring also to FIG. 8, a block diagram is shown of the decoder output timing with the AES/EBU SYNC (line 24) disabled or not present during normal timing. If no input is present on the decoder AES/EBU SYNC input line 24 (FIG. 1), then the output AES/EBU digital audio is generated by the internal clock source 2 that is either at the telephone or internal clock rate. FIG. 9 additionally shows a block diagram of the decoder output timing with the AES/EBU SYNC disabled or not present, and using internal crystal timing.

Referring to FIG. 1, a block diagram is shown of the decoder output timing with the AES/EBU SYNC (line 24) enabled and present using AES-timing. If the SYNC input is present, then the digital audio output is generated at the frequency of the SYNC input via the clock generator 25 being fed into the rate adaptor 252. This adapted rate is used by the D/A Converter 254, as well as the AES/EBU transmitter and receiver units 256 ... 258. The presence of a valid sync source is indicated by illumination of the front panel AES PLL LED. The sync frequency many be slightly different from that of the CODEC 1 clock source and again the rate synchronism is performed to prevent any undesired slips in the digital audio output. The SYNC input is assumed to be an AES/EBU signal with or without data present. The CODEC 1 only uses framing for frequency and sync determination.

Referring again to FIG. 2, this more detailed block diagram of CODEC 1 shows external digital input 16 entering AES/EBU receiver 13. The receiver output 14 then enters the Sample Rate Converter 11 and the rate is converted, if necessary, as described above. The convector 11 then feeds the rate adjusted bit stream via a line ill into the encoder 1 for coding and compression.

Conversely, FIG. 2 also shows the Decoder DSP 2 outputting a decoded and decompressed bit stream via a line 123 into the Sample Rate Converter 12. The converter 12 adapts the rate, if necessary, as described above and outputs the rate adjusted bit stream via line 122 into a AES/EBU Transmitter 126. The transmitter 126 then Outputs the digital signal through an external connection 22.

FIG. 2 also shows the AES/EBU digital synchronous input line 24 leading into a AES/EBU Receiver 146. The receiver 146 routes the received SYNC input data into the Sample Rate Converter 12 via a line 147. The converter 12 uses this SYNC input for rate adapting as described above.

Asynchronous Ancillary Data

The CODEC 1 is also capable of handling a variety of ancillary data in addition to primary audio data. The audio packet, for instance, consists of a header, audio data, and ancillary data. If the sampling rate is 48 KHz, then the length of each packet is 24 milliseconds. The header consists of a 12 bit framing pattern, followed by various bits which indicate, among other things, the data rate, sampling rate, and emphasis. These header bits are protected by an optional 16 bit CRC. The header is followed by audio data which describes the compressed audio signal. Any remaining bits in the packet are considered ancillary data.

Referring again to FIG. 1, the CODEC 1 provides for transmission of ancillary data via an asynchronous, bidirectional RS-232 input interface 39, and an output interface 62. These interfaces provide a transparent channel for the transmission of 8 data bits. The data format is 1 start bit, 8 data bits, 1 stop bit and no parity bits. A maximum data rate might be selected by the control processor 5. This interface is capable of transmitting at the maximum data rate selected for the encoder 1 and the decoder 2 and thus no data pacing such as XON/XOFF or CTS/RTS are provided.

The RS-232 data rates might be set from 3 to 19.2 bps. The use of the ancillary data channel decreases the number of bits available to the audio channel. The reduction of the audio bits only occurs if ancillary data is actually present. The data rate might be thought of as a maX3 data rate and 3 f there is no ancillary data present, then no ancillary data bits are transmitted. A typical example of this situation occurs when the CODEC 1 is connected to a terminal; when the user types a character, the character is sent to the decoder at the bit rate specified.

The setting of the decoder baud rate selection dip switches is done by considering the setting of the encoder. The decoder baud rate must be an equal or higher baud rate relative to the encoder. For example, it is possible to set the decoder ancillary baud rate to 9.6 baud. In this case, the encoder baud rate may be set to any value from 3 to 9.6 but not 19.2. If the decoder baud rate is set to a higher rate than the encoder, the data will burst out at the decoder's baud rate. The maximum sustained baud rate is therefore controlled by the encoder.

The compression technique for the transmission of ancillary data is as follows: the encoder looks, during each 24 millisecond frame interval, to see if any ancillary data is in its input buffer. If there are characters in the encoder's input buffer, then the maximum number of characters consistent with the selected baud rate are sent. During a 24 millisecond period, the table below shows the maximum number of characters per frame (at 48 kHz sampling rate) sent for each baud rate.

| BIT RATE | NUMBER OF CHARACTERS |
| --- | --- |
| 3 | 1 |
| 12 | 3 |
| 24 | 6 |
| 36 | 9 |
| 48 | 12 |
| 72 | 18 |
| 96 | 24 |
| 192 | 47 |

The CODEC 1 provides no error detection or correction for the ancillary data. The user assumes the responsibility for the error control strategy of this data. For example, at an error rate of le-5 (which is relatively high) and an ancillary data rate of 12 baud, 1 out of every 83 characters will be received in error. Standard computer data communication protocol techniques might be used to maintain data integrity. When designing an error protection strategy, it must be remembered that the CODEC 1 may occasionally repeat the last 24 milliseconds of audio under certain error conditions. The effect on audio is nearly imperceptible. However, the ancillary data is not repeated.

The format of the ancillary data is user defined. The present invention utilizes two formats for the ancillary data.

The first format treats the entire data stream as one logical (and physical) stream of data. The second format allows for multiplexing of various logical and diverse data streams into one physical data stream. For example, switch closure, RS232, and time code data are all multiplexed into a single physical data stream and placed in the ancillary data stream of the ISO MPEG packet.

Figure 3:
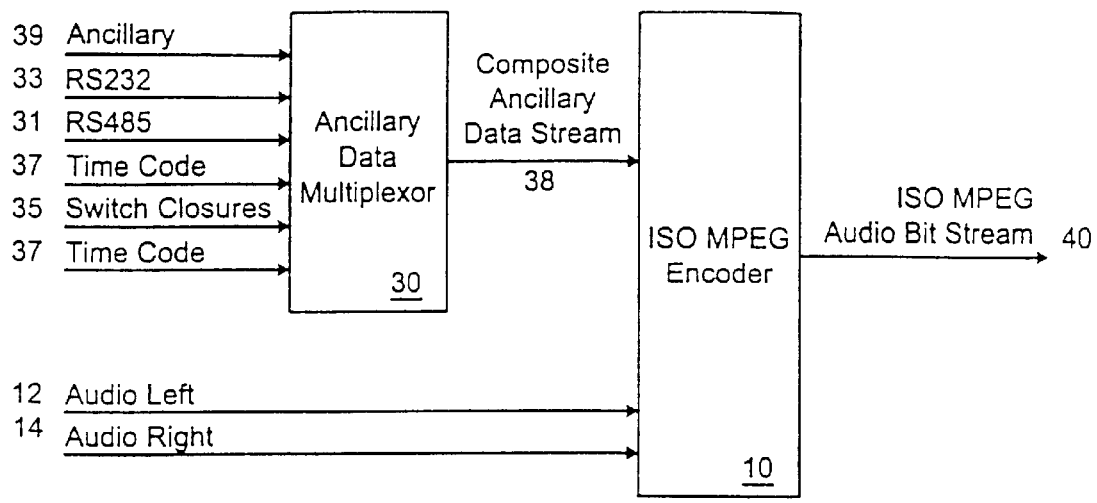
FIG. 3 is a block diagram illustrating ancillary data being multiplexed into a composite bit stream in accordance with the preferred embodiment of FIG. 1.

FIG. 1 shows a high level diagram of the asynchronous multiplexer (MUX) 3 in relation to the other CODEC components. FIG. 3 shows an isolated diagram of the multiplexer 3 in relation to encoder 1. The data rate for the multiplexer is set by software command (via remote control connections or keypad entry). A software command also controls a switch 34 (FIG. 1) which routes the ancillary data through multiplexer 3. Multiplexer output line 36 routes the multiplexed data into the encoder input line 38. Alternatively, if the switch 34 is in the other position, ancillary data will be routed directly to the encoder input line 38 via the input line 32 without multiplexing. When the multiplexer 3 is used, FIG. 1 shows signals from input sources such as RS485 (line 31), RS232 (line 33), contact closures (line 35), time codes (line 37), and ancillary data—RS232 (line 39). FIG. 3 shows similar inputs into multiplexer 3. These ancillary inputs are used as follows:

The RS232 I/O connector is used to provide an additional port into the data multiplexor. It might be thought of as a second RS232 ancillary port. The RS485 I/O connector is used to provide an additional type of port into the data multiplexer. It is a dedicated RS485 port and might be used to control RS485 equipment.

Contact closure inputs 3 allow simple ON/OFF switches to be interfaced into the CODEC 1. The contact closure inputs 3 are electrically isolated from the internal circuitry by optical isolators. A plurality of optical isolated I/O lines and/or contact closure lines might be used. Additionally, the time code inputs allow transmission of timecode at rates of 24, 25, 29, and 3 frames per second.

Referring again to FIG. 3, the Ancillary Data Multiplexer 3 multiplexes the various inputs into a composite ancillary data stream for routing to encoder input line 38. The encoder 1 then processes the digital audio signals (e.g. converted left and right analog inputs. AES/EBU, SPDIF, or optical) and the ancillary data stream (e.g. multiplexed composite or direct) into a compressed audio bit stream. In FIG. 3, an ISO/MPEG encoder 1 is shown, with the digital audio left and right signals, as well as a composite ancillary data stream, being processed by the ISO/MPEG encoder 1 into a resulting ISO/MPEG audio bit stream Other compression techniques besides ISO/MPEG could similarly be illustrated.

Figure 4:
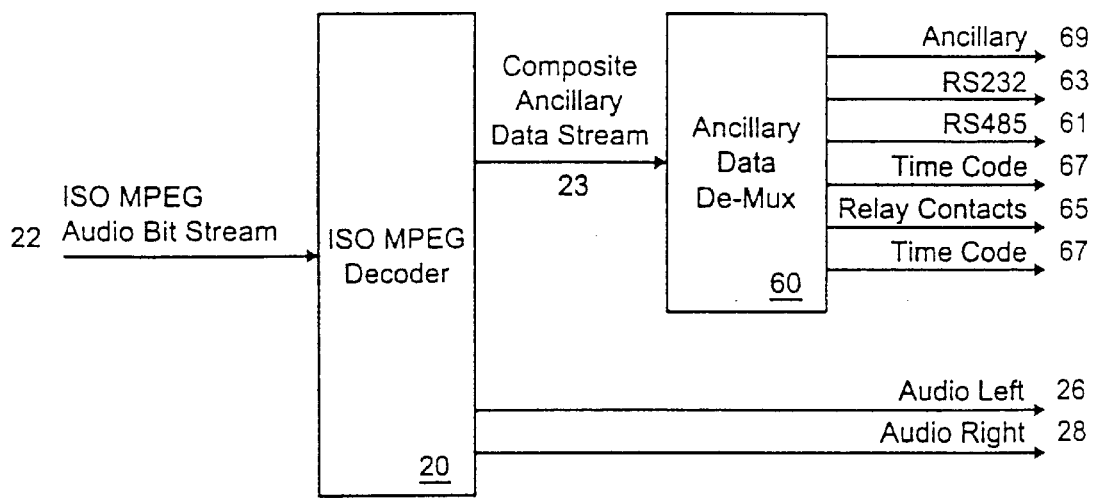
FIG. 4 is a block diagram illustrating an ISO/MPEG audio bit stream being decoded into a composite ancillary bit stream and audio left and right signals in accordance with the preferred embodiment of FIG. 1.

Conversely, a block diagram is shown in FIG. 4 wherein the ISO/MPEG Audio Bit Stream enters an ISO MPEG Decoder 2 on line 22. The bit stream is decoded (decompressed) and the ancillary data is separated from the audio data. The composite ancillary data stream enters the Ancillary Data De-Multiplexer 6 through line 23. The Ancillary data is de-multiplexed into its component parts of Ancillary, RS232, RS485, Time Code, and Relay Contact data, as shown by lines 61, 63, 65, 67, and 69. The audio data (left and right) is output on lines 26 and 28. A software command also controls a switch 64 (FIG. 1) that might route the ancillary data out of decoder 2, through the de-Multiplexer 6, through line 66, and out to ancillary data line 69. Alternatively, the ancillary data might be routed directly from decoder output line 23, though line 62, and out line 69—without multiplexing.

Referring again to FIG. 2, this more detailed block diagram of CODEC 1 shows external ancillary data entering the ancillary data switch 16 via line 39 and exiting switch 16 via line 69. (See lines 39, 69 and switches 34, 64 in FIG. 1). Switch 16 interacts with Ancillary Data UART (Universal Asynchronous Receiver Transmitter) via connections 164 and 165. Switch 16 also interacts with DSP Ancillary Data UART 169 via connections 166 and 167. The resulting data is sent through Switch 16 to encoder 1 via connection 162. Decoded ancillary data is sent through Switch 16 from decoder 2 via connection 163. Switch 16, Ancillary Data UART 168, and DSP Ancillary Data UART are controlled by Control Micro 5 via control network line 155.

FIG. 2 also details the following ancillary data connections: External RS232 data is shown entering RS232 UART 17 via line 33 and exiting UART 17 via line 69.

External Time Code Data is shown entering SMPTE Time Code Interface 172 via line 37 and exiting via line 67. Time Code Data is subsequently shown interacting with Time Code UART 174 via lines 173, 175. External RS485 data is shown entering RS485 UART 176 via line 31 and exiting via line 61. External optical inputs are shown entering Control micro network 155 via line 35. Relay outputs are, shown exiting Control micro network 155 via line 65. UARTS 17, 174, 176, and Time Code Interface 172 are controlled by Control Micro 5 via control network line 155.

Ancillary data can prove to be extremely valuable because it allows the CODEC user to transmit control and message information to and from RS232 and RS485 equipment, on either end of the transmission channel, via the same compressed digital bit stream as used by the audio signal component. The user might also send time code information and facilitate the control of relay contacts. More importantly, the use of ancillary data does not adversely affect the ability to transmit a sufficiently large amount of primary audio data.

Synchronous Ancillary Data

Referring again to FIG. 1, the CODEC 1 also provides a synchronous ancillary input data line 18 and output data line 25. The synchronous connections might exist separately (as shown in FIGS. 1 and 2) or as part of a multi-functional input line (e.g. optical isolated I/O, relay I/O and synchronous ancillary data I/O share a common line—not shown). This data port is an RS232 interface, and might also include RS422 and/or RS485 capabilities.

Digital Interface Modules and Loopback Control

Referring again to FIG. 1, encoder 2 outputs a compressed audio bit stream through line 4 (and possibly more lines) into at least one DIM 7. These modules might include, for example, the types X.21/RS422, V.35, and/or TA. These modules output the digital signals for use and/or transmission by equipment external to the CODEC. Similarly, DIM 8 is connected to decoder 2 through line 81. DIM 8, using similar type modules as DIM 7, collects the external digital signals for transmission to decoder 2. Referring again to FIG. 2, this more detailed block diagram of CODEC 1 shows the compressed bit stream entering H.221 DSP 19 via line 191. DSP processes the bit stream and transfers the data, via line 192, to at least one DIM (Module types shown as 198). DIM 198 interacts with TA Control UART 193 via lines 194, 195, and with Decoder DSP 2 via line 197. DIM 192 then outputs external data via line 71 and inputs external data via line 81. As discussed above, this external data is then used by external equipment such as transmitters and receivers.

Before any connection is made to the outside world, the DIMs in CODEC 1 must be defined. If the DIMs are rearranged, then the CODEC Must be notified via remote control software command (through the keypad or remote control interface). For DIMs that dial outside networks, two methods of dialing exist. They are single line dialing and multiple line dialing (speed dialing).

For either mode of dialing it is possible to enable automatic reconnect. This feature allows the automatic reconnection of a dropped line. If auto reconnect is enabled when a line is dialed, then it will be reconnected if either the far end disconnected the call, or the network drops the call. If the calling end drops the call, the line will not be automatically reconnected. This feature also allows the DIM to automatically dial an ISDN network if, for instance, a satellite connection is lost.

The CODEC 1 provides for two types of loopback through loopback control module 9. Loopback is an important feature for CODEC testing purposes. The first type is a system loopback and the second is a digital interface loopback. The system loopback is an internal loopback which loops back all the digital interfaces and is set by one software command. The second type of loopback allows the user to select individual digital interface modules for loopback. Loopback control might also be used to cause the internal CODEC clock to supply the digital data clocks.

Satellite Receiver Interfaced with CODEC

Figure 13:
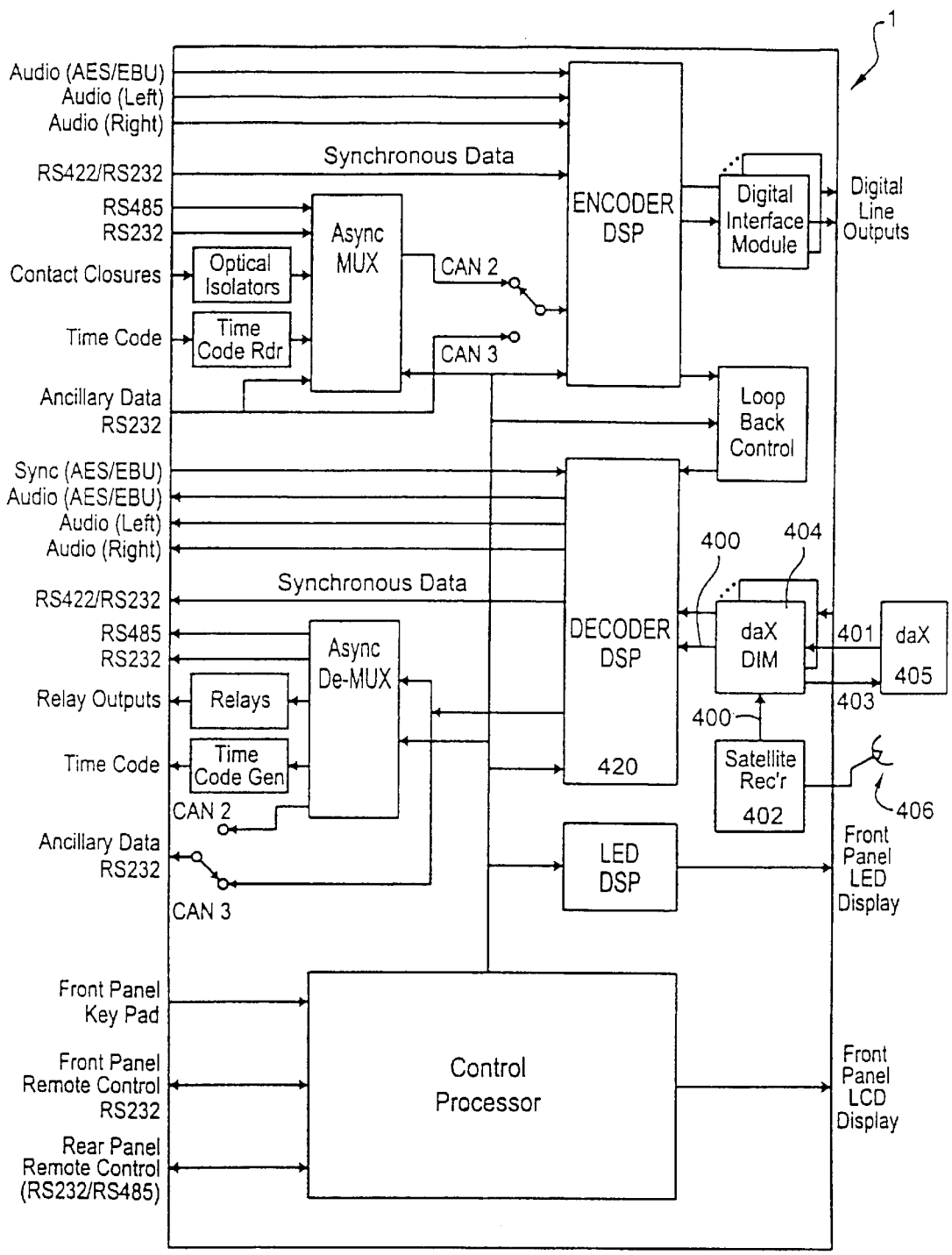
FIG. 13 is a block diagram of a CODEC illustrating signal connections between various components allowing transmission of audio, video, text, and graphical information in accordance with a preferred embodiment of the present invention.

Referring to FIG. 13, another embodiment of the disclosed invention allows for the transmission of other information besides audio, including, video, text, and graphics. In this embodiment, the digital line inputs 41 are preferably replaced with a satellite antenna 46. The digital interface module 42 (or satellite receiver module) receives digital signals that are transmitted to it by the satellite antenna 46. The digital signals, which are streams of data bits, are then transferred to a decoder 42. The decoder decompresses the bits, whether they are audio, video, text, or graphic, and directs them to the appropriate output.

Preferably, the digital interface module 42 has the ability to store digital information. In this alternate embodiment, the digital interface module (satellite receiver module) is preferable a receiver called a "daX". Such a receiver is available commercially under the name "daX" from Virtual Express Communications in Reno, Nev. In this embodiment, the decoder preferably would have the capability to decompress or decode other types of compressed information such as video, text, and graphics. This could be facilitated by downloading the required compression techniques into the CODEC 1 as described above.

In its operation, the satellite antenna 46 might receive digital information from various sources including a remote CODEC or a remote daX (not shown), and transfer the information to the daX receiver 42. The daX DIM 44 might also act as a switching mechanism to route the digital bit streams to different places. It might direct information received from the satellite directly to the decoder, via line 4, for decompression and immediate output. The received, data from the satellite receiver 42 might alternatively be directed through the daX DIM 44 to the daX 45 via line 43 for storage and later retrieval. The digital interface module 44 might then direct these stored data bits from the daX 45 to the decoder 42 via path 4 for decoding and subsequent output. This embodiment also preferably allows for simultaneous storage of digital information in the DAX via path 43 and for immediate decoding of digital information via line 4 through the decoder 42.

While few preferred embodiments of the invention have been described hereinabove, those of ordinary skill in the art will recognize that these embodiments may be modified and altered without departing from the central spirit and scope of the invention. Thus, the embodiments described hereinabove are to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A programmable CODEC for compression and decompression of signals comprising:
   a first for receiving an input signal;
   an encoder having programmable compression unit for encoding and compressing said input signal into a first compressed digital bit stream;
   an output from said encoder selectively connected to a node of one of a plurality of transmission facilities;
   a decoder having a programmable decompression unit for decoding and decompressing a received compressed digital bit stream into a decompressed signal;
   an input of said decoder connected to said node of said one of said plurality of transmission facilities;
   an output from said decoder for outputting said decompressed signal.

2. The programmable CODEC as claimed in claim 1 wherein said transmission facility comprises an analog transmission facility.

3. The programmable CODEC as claimed in claim 1 wherein said transmission facility comprises a digital transmission facility.

4. The programmable CODEC as claimed in claim 3 wherein said digital transmission facility comprises at least one conventional telephone line.

5. The programmable CODEC as claimed in claim 3 wherein said digital transmission facility comprises at least one ISDN line.

6. The programmable CODEC as claimed in claim 3 wherein said digital transmission facility comprises at least one E1 line.

7. The programmable CODEC as claimed in claim 3 wherein said digital transmission facility comprises at least one T1 line.

8. The programmable CODEC as claimed in claim 3 wherein said digital transmission facility comprises spread spectrum RF transmission.

9. The programmable CODEC as claimed in claim 3 wherein said digital transmission facility comprises a satellite link.

10. The programmable CODEC as claimed in claim 1 wherein said encoder further comprises a microprocessor.

11. The programmable CODEC as claimed in claim 10 further comprising a plurality of programmed compression/decompression algorithms for selectively configuring said microprocessor for encoding and compressing said input signal.

12. The programmable CODEC as claimed in claim 11 wherein at least one of said plurality of programmed compression/decompression algorithms can be upgraded.

13. The programmable CODEC as claimed in claim 11 wherein at least one of said plurality of programmed compression/decompression algorithms can be downloaded from an external source.

14. The programmable CODEC as claimed in claim 1 wherein said decoder further comprises a microprocessor.

15. The programmable CODEC as claimed in claim 14 further comprising a plurality of programmed compression/decompression algorithms for selectively configuring said microprocessor for decoding and decompressing said compressed digital bit stream.

16. The programmable CODEC as claimed in claim 15 wherein at least one of said plurality of programmed compression/decompression algorithms can be upgraded.

17. The programmable CODEC as claimed in claim 15 wherein at least one of said plurality of programmed compression/decompression algorithms can be downloaded from an external source.

18. The programmable CODEC as claimed in claim 1 wherein said encoder outputs said first compressed digital bit stream.

19. The programmable CODEC as claimed in claim 1 wherein said first compressed digital bit stream has a word length having a plurality of bits.

20. The programmable CODEC as claimed in claim 19 wherein said word length has at least 16 bits.

21. The programmable CODEC as claimed in claim 20 wherein said word length has 24 bits.

22. The programmable CODEC as claimed in claim 1 wherein said input signal is a digital input signal.

23. The programmable CODEC as claimed in claim 1 wherein said input signal is an analog input signal.

24. The programmable CODEC as claimed in claim 1 further comprising an analog to digital converter.

25. The programmable CODEC as claimed in claim 24 wherein said input signal is converted to a digital input signal.

26. The programmable CODEC as claimed in claim 1 wherein said encoder has a maximum sampling rate having an absolute value equal to two times an absolute value of a bandwidth of a selected one of said plurality of digital transmission facilities.

27. The programmable CODEC as claimed in claim 26 wherein said bandwidth corresponds to at least a bandwidth of a human audio spectrum.

28. The programmable CODEC as claimed in claim 1 wherein said audio signal comprises a plurality of channels.

29. The programmable CODEC as claimed in claim 1 wherein a selected one of said plurality of digital transmission facilities further comprises a network.

30. The programmable CODEC as claimed in claim 29 wherein said network is a local area network.

31. The programmable CODEC as claimed in claim 29 wherein said network is a wide area network.

32. The programmable CODEC as claimed in claim 29 wherein said network is a publicly accessible network.

33. The programmable CODEC as claimed in claim 32 wherein said publicly accessible network is a world wide web.

34. The programmable CODEC as claimed in claim 1 further comprising a plurality of external ports.

35. The programmable CODEC as claimed in claim 34 wherein said plurality of external ports further comprises at least one RS-232 connection.

36. The programmable CODEC as claimed in claim 34 wherein said plurality of external ports further comprises at least one RS-485 connection.

37. The programmable CODEC as claimed in claim 34 wherein said plurality of external ports further comprises at least one ISDN connection.

38. The programmable CODEC as claimed in claim 34 wherein said plurality of external ports further comprises at least one E1 line connection.

39. The programmable CODEC as claimed in claim 34 wherein said plurality of external ports further comprises at least one T1 line connection.

40. The programmable CODEC as claimed in claim 34 wherein said plurality of external ports further comprises at least one spread spectrum RF connection.

41. The programmable CODEC as claimed in claim 34 wherein said plurality of external ports further comprises at least one satellite connection.

42. The programmable CODEC as claimed in claim 34 wherein said plurality of external connections further comprises at least one time-code connection.

43. The programmable CODEC as claimed in claim 34 wherein said plurality of external ports further comprises at least one contact closure connection.

44. The programmable CODEC as claimed in claim 43 further comprising an optical isolator.

45. The programmable CODEC as claimed in claim 43 further comprising a plurality of contact closure connections.

46. The programmable CODEC as claimed in claim 45 further comprising eight contact closure connections.

47. The programmable CODEC as claimed in claim 34 whereby ancillary input data can be provided to said CODEC by at least one of said plurality of external ports.

48. The programmable CODEC as claimed in claim 47 whereby said ancillary data comprises a plurality of kilobaud.

49. The programmable CODEC as claimed in claim 48 whereby said plurality of kilobaud is at least 38.4 kilobaud.

50. The programmable CODEC as claimed in claim 1 wherein said first compressed digital bit stream includes ancillary data.

51. The programmable CODEC as claimed in claim 1 further comprising an inverse multiplexer.

52. The programmable CODEC as claimed in claim 51 wherein said input signal can be separated into a plurality of sub-signals prior to being encoded and compressed.

53. The programmable CODEC as claimed in claim 52 wherein said encoded and compressed plurality of sub-signals can be decoded and decompressed.

54. The programmable CODEC as claimed in claim 53 wherein said decoded and decompressed plurality of sub-signals can be reassembled into a composite signal.

55. The programmable CODEC as claimed in claim 1 further comprising a sampling rate converter for setting a sampling rate of said decoder as a multiple of a sampling rate of said encoder.

56. The programmable CODEC as claimed in claim 55 wherein said multiple is greater than 0.5.

57. The programmable CODEC as claimed in claim 55 wherein said multiple is less than 2.0.

58. A programmable CODEC for compression and decompression of signals comprising:
    a first input for receiving an input signal;
    an encoder having a programmable compression unit for encoding and compressing said input signal into a first compressed digital bit stream;
    an output from said encoder selectively connected to a node of one of a plurality of transmission facilities;
    a decoder having a programmable decompression unit for decoding and decompressing a received compressed digital bit stream into a decompressed signal;
    an input of said decoder connected to said node of said one of said plurality of digital transmission facilities;
    an output from said decoder for outputting said decompressed signal;
    wherein said encoder has a maximum sampling rate having an absolute value equal to two times an absolute value of a bandwidth of a selected one of said plurality of digital transmission facilities.

59. An interconnected first CODEC and second CODEC, interconnected to each other through a selected one of a plurality of digital transmission facilities, each of said CODECS having:

an input for receiving an input signal;

an encoder having a programmable compression unit for encoding and compressing said input signal into a first compressed digital bit stream;

a microprocessor;

a plurality of programmed compression/decompression algorithms for selectively configuring said microprocessor for encoding and compressing said input signal and for selectively configuring said microprocessor for decoding and decompressing said compressed digital bit stream;

an output from said encoder selectively connected to a node of one of a plurality of transmission facilities;

a decoder having a programmable decompression unit for decoding and decompressing a received compressed digital bit stream into a decompressed signal;

an input of said decoder connected to said node of said one of said plurality of digital transmission facilities;

an output connected to said decoder for outputting said decompressed signal;

whereby a selected one of said plurality of programmed compression/decompression algorithms of said first CODEC controls a selected one of said plurality of programmed compression/decompression algorithms of said decoder of said second CODEC.

60. The interconnected first CODEC and second CODEC as claimed in claim 59 having asynchronous coding whereby a selected one of said plurality of programmed compression/decompression algorithms of said encoder of said first CODEC is different from a selected one of said plurality of programmed compression/decompression algorithms of said encoder of said second CODEC.

61. The interconnected first CODEC and second CODEC as claimed in claim 59 whereby a selected one of said plurality of programmed compression/decompression algorithms of said first CODEC determines a sampling rate of said decoder of said second CODEC.

* * * * *

UNITED STATES PATENT AND TRADEMARK OFFICE
CERTIFICATE OF CORRECTION

PATENT NO. : 6,339,756 B1
DATED : January 15, 2002
INVENTOR(S) : Larry W. Hinderks It is certified that error appears in the above-identified patent and that said Letters Patent is hereby corrected as shown below:

<u>Column 34,</u>
Line 7, after "first" insert -- input --.

Signed and Sealed this

Sixth Day of August, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,339,756 B1
DATED : June 4, 2002
INVENTOR(S) : Cheruvallath et al.

It is certified that error appears in the above-identified patent and that said Letters Patent is hereby corrected as shown below:

<u>Column 1,</u>
Line 51, please delete "on" and insert therefor -- one --;

<u>Column 5,</u>
Line 43, please delete "$C_{1\text{-}C8}$" and insert therefor -- $C_1\text{-}C_8$ --;

<u>Column 17,</u>
Line 16, please delete "oigomeric compound" and insert therefor -- oligomeric compound --;

<u>Column 19,</u>
Line 67, please delete "$\text{-OH}_4$" and insert therefor -- $\text{-OX}_4$ --;

<u>Column 29,</u>
Line 27, please delete "hors." and insert therefor -- hours --;
Line 56, please delete "dicarbonate" and insert therefor -- bicarbonate --;

<u>Column 31,</u>
Line 1, please delete "$N^4$-Benzoyl-05'-" and insert therefor -- $N^4$-Benzoyl-5'- --;

<u>Column 34,</u>
Line 7, please delete "5'-d(CGG-" and insert therefor -- 5'-dGCC- --;

<u>Column 50,</u>
Line 11, please delete the $2^{nd}$ "silyl,";

<u>Column 52,</u>
Line 52, please delete "o;" and insert therefor -- O; --;

UNITED STATES PATENT AND TRADEMARK OFFICE
CERTIFICATE OF CORRECTION

PATENT NO.     : 6,339,756 B1
DATED          : June 4, 2002
INVENTOR(S)    : Cheruvallath et al.

It is certified that error appears in the above-identified patent and that said Letters Patent is hereby corrected as shown below:

<u>Column 54,</u>
Line 58, please delete "$R_2$" and insert therefor -- $R_1$ --.

Signed and Sealed this

Twenty-first Day of January, 2003

JAMES E. ROGAN
*Director of the United States Patent and Trademark Office*